(12) United States Patent
Van Andel et al.

(10) Patent No.: US 6,314,456 B1
(45) Date of Patent: Nov. 6, 2001

(54) SERVING DATA FROM A RESOURCE LIMITED SYSTEM

(75) Inventors: Robert J. Van Andel; Robert H. Becker, both of Boxborough, MA (US)

(73) Assignee: Allegro Software Development Corporation, Boxborough, MA (US)

( * ) Notice: Subject to any disclaimer, the term of this patent is extended or adjusted under 35 U.S.C. 154(b) by 0 days.

(21) Appl. No.: 09/014,947

(22) Filed: Jan. 28, 1998

Related U.S. Application Data

(63) Continuation-in-part of application No. 08/847,006, filed on May 1, 1997.
(60) Provisional application No. 60/043,044, filed on Apr. 2, 1997.

(51) Int. Cl.[7] .................................................. G06F 15/16
(52) U.S. Cl. ............................. 709/218; 709/219; 709/231
(58) Field of Search .................................... 709/219, 214, 709/216, 217, 218, 229, 231; 707/501, 10; 345/333, 335

(56) References Cited

U.S. PATENT DOCUMENTS

| | | | |
|---|---|---|---|
| 5,774,660 | * | 6/1998 | Brendel et al. ........................ 709/201 |
| 5,774,670 | * | 6/1998 | Montuli ................................. 709/227 |
| 5,793,964 | * | 8/1998 | Rogers et al. ........................ 709/202 |
| 5,796,952 | * | 8/1998 | Davis et al. ........................... 709/224 |
| 5,805,442 | | 9/1998 | Crater et al .......................... 364/138 |
| 5,813,006 | * | 9/1998 | Polnerow et al. ..................... 707/10 |
| 5,835,914 | * | 11/1998 | Brim ................................... 707/206 |
| 5,838,682 | * | 11/1998 | Dekelbaum et al. ................. 370/401 |
| 5,855,015 | * | 12/1998 | Sholam .................................. 707/5 |
| 5,857,197 | * | 1/1999 | Mullins ............................... 707/103 |
| 5,878,218 | * | 3/1999 | Maddalozzo, Jr. et al. ......... 709/213 |
| 5,931,904 | * | 8/1999 | Banga et al. ......................... 709/217 |
| 5,935,210 | * | 8/1999 | Stark ................................... 709/224 |
| 5,941,944 | * | 8/1999 | Messerly ............................. 709/203 |
| 5,956,487 | | 9/1999 | Venkatraman et al. ......... 395/200.48 |

OTHER PUBLICATIONS

O'Shea, P.J. et al., "European Law Databases: an Experiment in Retrieval", IEEE Computer Soc., ISBN: 0–8486–8147, pp. 227–232, Sept. 1997.*
Wadge, B. et al., "Intensional HTML", PODDP'98 Proceedings, ISBN: 3–540–65086–5, pp. 128–139, Mar. 1998.*
Kindberg, T. et al. "People, Places, Things: Web Presence for the Real World", IEEE Workshop, ISBN: 0–7695–0816–2, pp. 19–28, Dec. 2000.*
Tektronix, Inc. "PhaserLink software", Printed from Internet on Aug. 8, 1997, http://www.tek.com/Color_Printers/userdoc/PShare3/intro10.htm.
Tektronix, Inc. "PhaserLink Demo", Printed from Internet on Aug. 8, 1997, http://www.tek.com/Color_Printers/support/demo/html.
Tektronix, Inc. "PhaserLink (tm) Press Release", Printed from Internet on Aug, 8, 1997, http://www.tek.com/Color_Printers/whats_new/phaserlink_release.html.

(List continued on next page.)

*Primary Examiner*—Zarni Maung
*Assistant Examiner*—Jason D. Cardone
(74) *Attorney, Agent, or Firm*—Fish & Richardson P.C.

(57) ABSTRACT

A data resource request signal is received on a first device connected to a network. A first resource object is selected in the first device. For a plurality of sequential page items associated with the first resource object, successive data fragments are generated according to instructions specified by the successive page items. At least the successive data fragments are concatenated to form a stream of formatted data. The stream of formatted data is transmitted to a second device via the network.

50 Claims, 21 Drawing Sheets

OTHER PUBLICATIONS

Tribe Computer Works, "Press Release: Tribe Launches Innovative Remote Management Solution", Dated May 22, 1995 (Printed from Internet on Aug. 8, 1997), http://www.tribe.com/products/webmanage/wm¯pr.html.

Tribe Computer Works, "WebManage", Printed from Internet Aug. 8, 1997, http://www.tribe.com/products/webmanage/index.html.

Portia Isaacson, "Emerging Technologies Review Collumn", dated Sep. 25, 1995 (printed from Internet on Aug. 11, 1997, Computer Reseller News, http://www.dreamit.com/articles/crn/crn950925/crn950925.htm.

Mel Beckman, "Remote Access Servers", dated Apr. 1996 (printed from Internet on Aug. 11, 1997), Macworld, http://www.macworld.com/pages/april.96/Reviews.1957.html.

Charles Lin, "Remote Access Servers", dated Feb. 6, 1996 (printed from Internet on Aug. 11, 1997), PC Magazine, http://www8.zdnet.com/pcmag/issues/1503/pcm00123.htm.

GCC Technologies, Inc., "GCC's WebAdmin(TM) pioneers web–based printer management", dated Nov. 11, 1996 (printers from Internet on Aug. 8, 1997), http://www.gcctech.com/webadmin–pr. html.

U. S. Software, Inc., "SNMP for USNET", Printed from Internet on Apr. 9, 1998, http://www.ussw.com/snmp_usnet.html.

U.S. Software, Inc., "UNSET Internet Access Package", Printed from Internet on Apr. 9, 1998, http://www.ussw.com/iap_usnet.html.

Spyglass, Inc. "Spyglass DeviceMail Solutions", Printed from Internet on Apr. 9, 1998, http://www.spyglass.com/solutions/technologies/devicemail/Index.html.

Spyglass, Inc., "Spyglass DeviceMail Solutions –Detailed Information", Printed from Internet on Apr. 9, 1998, http://www/spyglass.com/solutions/technolgies/devicemail/details.html.

* cited by examiner

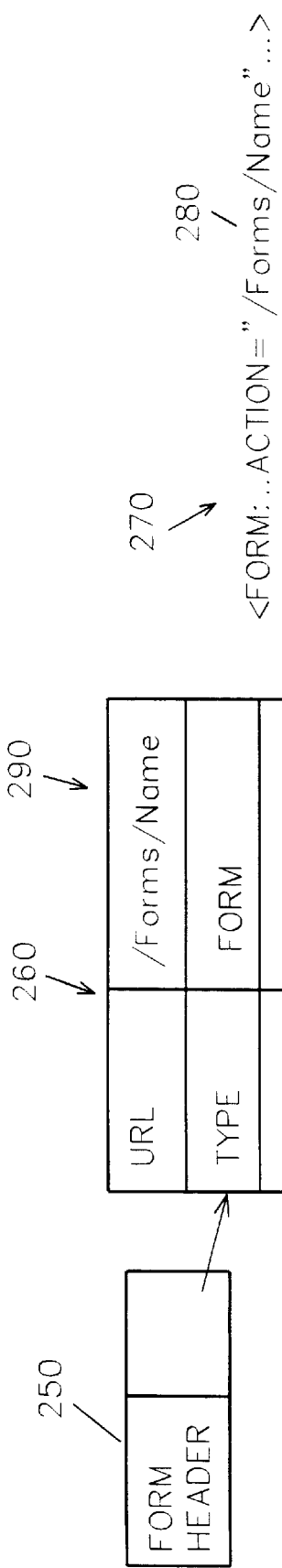

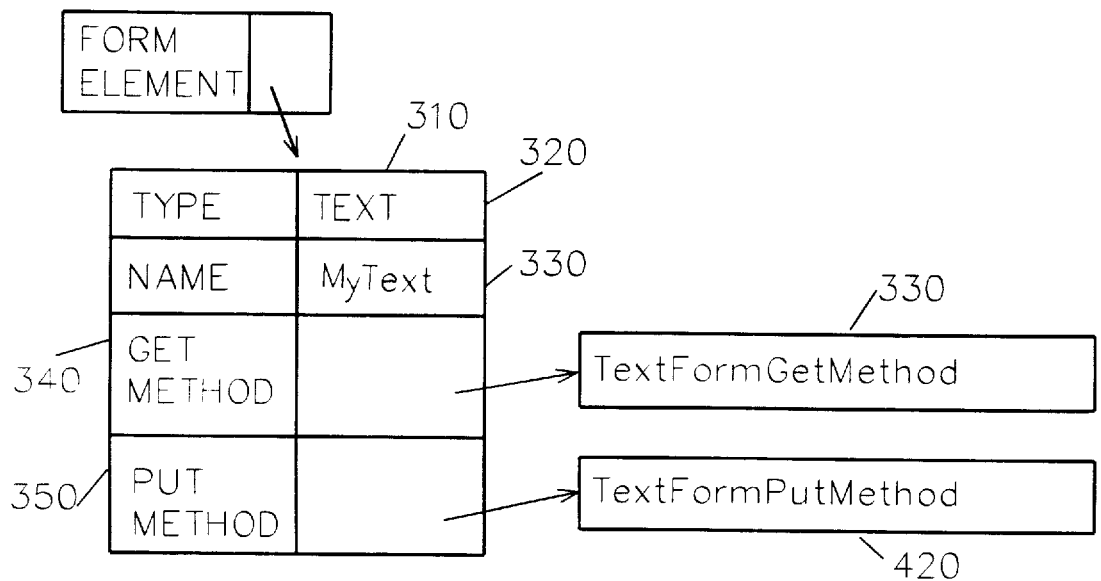
FIG. 8A
$$\text{360}$$
<INPUT TYPE="TEXT" —— 362
  NAME="MY TEXT" —— 364
  VALUE="DEFAULT STRING"> —— 366
FIG. 8B
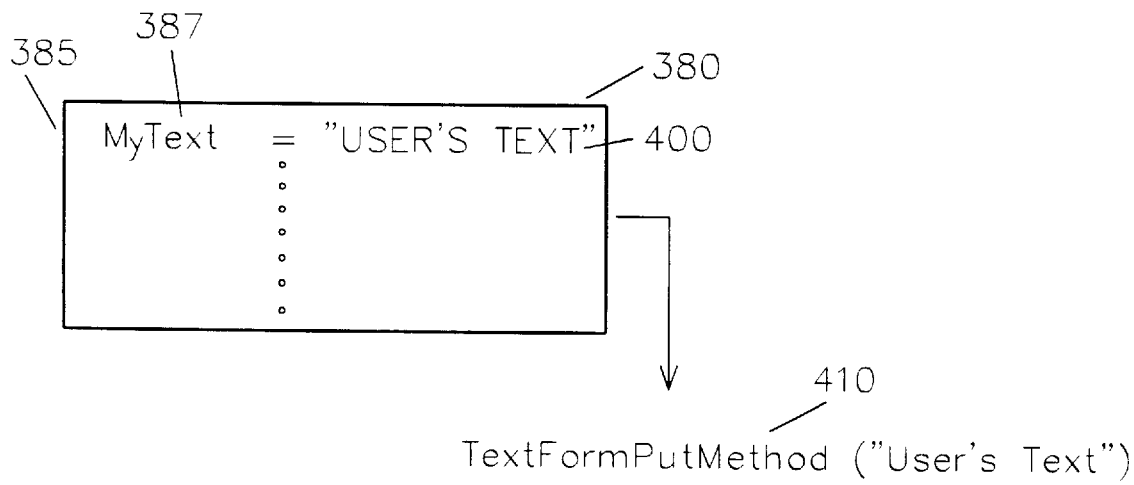
FIG. 8C

```
630 → <TR><TD><B>Slot 1
650 → </B><TD>
600 → <TD><FONT SIZE=+2><A HREF="/PortInfo?1.1    ⎤
610 → ">1                                          ⎥ 660
620 → </A></TD>                                    ⎦
600 → <TD><FONT SIZE=+2><A HREF="/PortInfo?1.2    ⎤
610 → ">2                                          ⎥ 660
620 → </A></TD>                                    ⎦
600 → <TD><FONT SIZE=+2><A HREF="/PortInfo?1.3    ⎤
610 → ">3                                          ⎥ 660
620 → </A></TD>                                    ⎦
600 → <TD><FONT SIZE=+2><A HREF="/PortInfo?1.4    ⎤
610 → ">4                                          ⎥ 660
620 → </A></TD>                                    ⎦
680 → <P></TR>
630 → <TR><TD><B>Slot 2
650 → </B></TD>
600 → <TD><FONT SIZE=+2><A HREF="/PortInfo?2.1    ⎤
610 → ">1                                          ⎥ 660
620 → </A></TD>                                    ⎦
600 → <TD><FONT SIZE=+2><A HREF="/PortInfo?2.2    ⎤
610 → ">2                                          ⎥ 660
620 → </A></TD>                                    ⎦
600 → <TD><FONT SIZE=+2><A HREF="/PortInfo?2.3    ⎤
610 → ">3                                          ⎥ 660
620 → </A></TD>                                    ⎦
600 → <TD><FONT SIZE=+2><A HREF="/PortInfo?2.4    ⎤
610 → ">4                                          ⎥ 660
620 → </A></TD>                                    ⎦
680 → <P></TR>
```

FIG. 9b

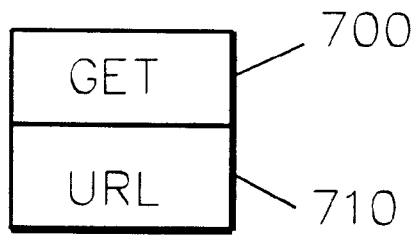
FIG. 10(a)
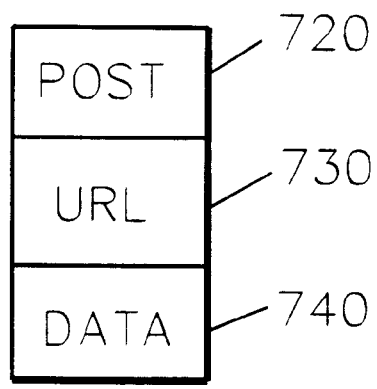
FIG. 10(b)
<RESOURCE LOCATION>?<DATA>
750   760   770
FIG. 10(c)

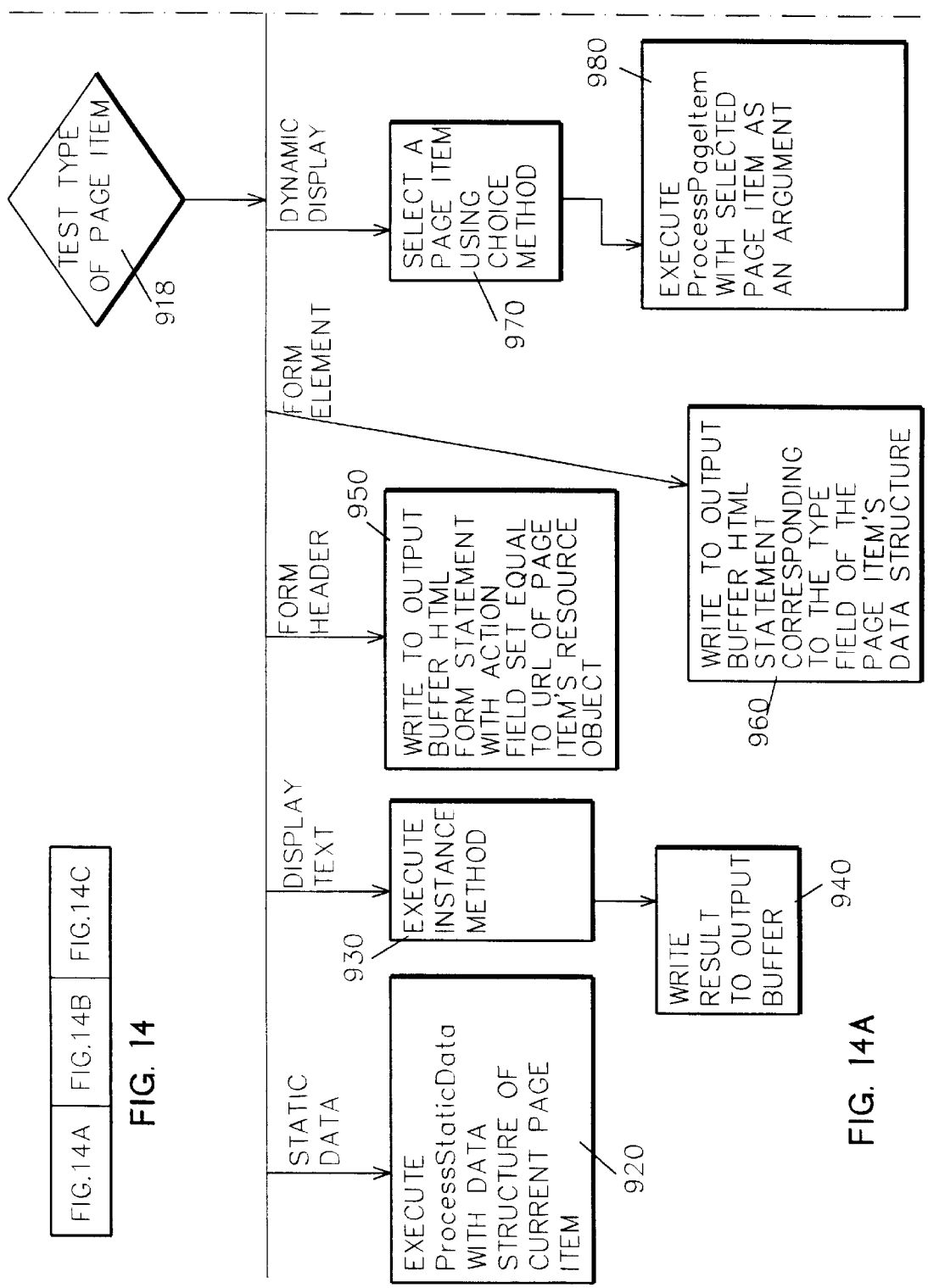

SERVING DATA FROM A RESOURCE LIMITED SYSTEM

This application is a continuation-in-part of application Ser. No. 08/847,006, filed May 1, 1997, which claims priority from provisional application Ser. No. 60/043,044, filed Apr. 2, 1997.

BACKGROUND OF THE INVENTION

The invention relates to serving data from a resource limited system.

The increasingly widespread use of the Internet and the World Wide Web in business environments has led to the establishment of TCP/IP, the Internet's transport protocol, as the de facto standard for domestic and international networked communications between individuals and organizations. Concomitantly, organizations have come to recognize the value of adopting TCP/IP as an internal networking protocol for use with so-called "intranets." An organization's internal use of TCP/IP-based networks permits the organization to exploit the growing body of software designed for the Internet, and in particular web browsers, for internal purposes.

A web browser is a program which is capable, while running on a given computer system, of displaying audio-visual hypertext data (known as web pages) transmitted from a remote computer system (known as a web site) which is connected to the given computer via a TCP/IP based network. Web browsers are also capable of receiving input from a user (typically in response to information displayed on a web page), and transmitting that information back to the web site.

A web site is said to "serve" a web page when it transmits "web page data" to a web browser running on a remote computer system, in response to a request from that browser. Web page data consists of a stream of instructions to the web browser describing the appearance and contents of the web page. These instructions may include simple text and formatting commands, as well as instructions to include other resources, such as audio or graphics files which can be access via the network. They may also include instructions for creating hypertext links to other web pages, and for creating input forms by which the user may input data to the web browser to be transmitted to a web site.

The software on a web site which performs this task is called a "web server." The web server and web browser typically communicate using a transfer protocol known as Hypertext Transfer Protocol (HTTP) (which describes how data are transmitted between the server and the browser), and a content protocol known as HyperText Markup Language (HTML) (which describes how the data transmitted to the web browser should be displayed).

Communication between a web browser and a web server is typically initiated by the web browser transmitting to the web server an HTTP "request" message, requesting that web page information be transmitted to the web browser. The request will include a "Universal Resource Locator" (URL), which specifies to the web server the location of the information being sought.

The request may also contain additional data which can be used by the web server to further define the information being requested by the web browser.

HTTP provides two principal types of request messages, GET and POST. In a GET message, any additional data is appended to the URL to create a string of the form <URL>?<DATA>. In the case of a POST message, any additional data is transmitted in a separate segment of the request message.

In a typical web site, a URL identifying information on that web site corresponds to a particular file stored on the web site's file system. When an HTTP request message is received at the web site, the file type of the file associated with the URL specified in the HTTP request is checked. If the file contains data, the web server responds to the HTTP request by transmitting the contents of that file back to the web browser. If the file is a program file, the program is executed, and the output of that program is transmitted back to the requesting web browser.

When the file is a program file, the additional data contained in the HTTP request may be accessed by the program when it executes. The additional data is typically passed to the program according to a protocol known as Common Gateway Interface (CGI). This mechanism permits the program to generate output which is dependent on the inputs received from the web browser.

The data transmitted to a web browser in response to an HTTP request may consist of data in any one of a variety of formats. One frequently used format is HTML. If the data represents a web page in HTML format it will consist of a sequence of ASCII text including HTML statements. Typically, some of the HTML statements will indicate that data found at other URLs should be included in the web page display. When a web browser receives such an HTML statement, it issues HTTP commands to retrieve the data specified by the URL, and includes the data received in response in its display of the web page. These references to other URLs, which I refer to as "client-side includes," permit a single file of HTML statements to represent a web page composed of data from multiple locations. For example, a web page could include a graphical image which is stored in a different location than the page itself. Note that the included data does not presently consist of additional HTML statements.

By contrast to a "client-side include", which entails the web browser incorporating external information into a web page before displaying it, some web servers support "server-side includes," statements within an HTML file which cause the web server to insert dynamically generated information within the file just prior to transmitting it to the requesting web browser.

As described above, a web server is also capable of receiving data from a web browser. Typically, this data is provided through the HTML "forms" mechanism. An HTML FORM statement contained within a web page directs the web browser to display interactive data input mechanisms (e.g. radio buttons, check boxes, text input boxes) to the user. The user can use these mechanisms to specify information which is then transmitted back to a program on the web site specified by a URL within the FORM statement. The receiving program typically processes the form data and outputs an HTML page in response.

Another class of software systems which are widely used on the Internet are electronic mail (email) processing systems. Email processing systems permit email messages to be transferred between computer systems on the internet in a unilateral fashion. That is, an email message may be sent from a first computer system to a second computer system, without the second computer having requested the transfer. Email messages are typically directed to a specific file system directory or file on the recipient computer system known as a "mailbox." Incoming messages are appended to the mailbox permitting a user to view them at a later time.

Internet email messages include header information, and a body. The header information includes at a minimum, addressing information indicating the address to which the message is directed. An email message may also include attachments, which are files appended to, but conceptually separate from, the main body of the message. The internet mail protocol is known as the Simple Mail Transport Protocol (SMTP) and is described, for example, in Request for Comments (RFC) 821, "Simple Mail Transport Protocol", published by the Internet Engineering Task Force. The standard format for internet mail messages is described in Request for Comments (RFC) 822, "Mail Message Format", published by the Internet Engineering Task Force.

The growing use of intranets has created a demand to use web browsers to access/or and configure "resource limited systems." A resource limited system lacks one or more of the computing resources of a typical personal computer or workstation: a hard disk drive, a general purpose operating system, or adequate RAM to effectively operate a conventional web server. Examples of such resource-limited systems include non-standard internal devices such as internetworking equipment (e.g. routers, switches, and hubs); printers; power management devices; and industrial control equipment.

A web browser provides a potentially excellent interface for accessing and configuring non-standard internal devices. By using a standard web browser, a user could access web pages to display status information from a networked device, and by using the HTML forms mechanism a user could transmit control information to the device.

However, existing web servers are typically designed to run on a disk-based personal computer or workstation running a standard commercially available operating system such as UNIX, OS/2, Microsoft Windows or Apple Macintosh OS. They are thus ill-suited to run on a resource limited system.

While some non-standard internal devices do support operating systems which provide disk system emulation routines and multiple processing, these more complex operating system facilitate the use of conventional web servers only at the cost of placing significant demands on the system's limited process or memory resources.

SUMMARY OF THE INVENTION

The present invention provides a method for serving data from a networked device. Data is generated from a resource object associated with Page Items representing fragments of data (e.g. HTML statements or other text information).

A data resource request signal (e.g. an HTTP GET message, a signal generated by the device hardware) is received at a first device. A first resource object is selected in the first device. For a plurality of sequential page items associated with the first resource object, successive data fragments are generated according to instructions specified by the successive page items. At least the successive data fragments are concatenated (e.g. placed in sequence in a buffer) to form a stream of formatted data. The stream of web page data is transmitted to a second networked device via the network.

Preferred implementations may include one or more of the following features.

The data resource request signal may be a signal generated within the first device.

The data resource request signal may be a message received from the second device via the network.

The message received from the second device may be an email message.

The message received from the second device may be an HTTP message.

The request message received from the second device may further contain web page form data (e.g. a plurality of name=value pairs representing responses to HTML form inputs), a second resource object in the first device may be identified, and, for name=value pairs specified in the web page form data page, items associated with the second resource object may be selected such that the name associated with the page item corresponds to the name of the name=value pair and the value of the name=value pair may be processed according to instructions specified by the selected page item.

The instructions specified by a page item may include substituting tokens with text strings according to a lookup dictionary.

The instructions specified by a page item may include generating data fragments according to instructions specified by a plurality of page items specified by the page item.

The instructions specified by at least one of the successive page items may include instructions for initializing state information associated with the page item (e.g. setting an index variable to a start value associated with the page item) and, while a test specified by the page item (e.g. comparing the index variable to a limit value specified by the page item) produces a positive result, repeating steps including, generating data fragments according to instructions specified by a plurality of page items specified by the page item and performing other steps specified by the page item (e.g. incrementing the index variable by an increment value specified by the page item).

The state information may be an index variable, the state information may be initialized by setting the index variable to a start value specified by the page item, the test may compare the index variable to a limit value specified by the page item, and the other steps specified by the page item may include incrementing the index variable by an amount specified by the page item.

The message received from the second device may further contain coded information (e.g. a string of the form "?i,j,k" appended to the URL, where i, j and k are integers) and instructions specified by the successive page items may depend on the coded information.

The first device may be a resource limited system.

The first device may not have a hard disk drive.

The message received from the second device may includes a Universal Resource Locator.

At least one of the plurality of successive page items from which successive data fragments (e.g. HTML form INPUT statements) are generated may be the same as the selected page item having its associated name corresponding to the name=value pair (e.g. the web page form data corresponding to a user's response to an HTML form INPUT statement generated according to instructions specified by the page item).

The first resource object may be specified by the data resource request signal.

The second resource object may be specified by the data resource request signal and the first resource object may be specified by the second resource object.

The stream of formatted data may include HTML data.

The stream of formatted data may include an email message.

The stream of formatted data may be transmitted using the HTTP protocol.

The stream of formatted data may be transmitted using the SMTP protocol.

At least one of the page items associated with the first resource object may also be associated with at least a second resource object distinct from the first.

Other features and advantages of the invention will become apparent from the following description of preferred embodiments, including the drawings, and from the claims.

BRIEF DESCRIPTION OF THE DRAWINGS

FIG. 7(a) is a block diagram of a Page Item of Type FORM HEADER.

FIG. 7(b) is a TEXT statement corresponding to the Page Item of FIG. 7(a).

FIG. 8(a) is a block diagram of a Page Item of Type FORM ELEMENT.

FIG. 8(b) is an TEXT statement corresponding to the Page Item of FIG. 8(a).

FIG. 8(c) is a diagram illustrating how a Put Method is applied to form data received from a Web browser.

FIG. 9(b) shows a series of HTML fragments corresponding to the Page Item of FIG. 9(a).

FIG. 10(a) is a block diagram of an HTTP GET request.

FIG. 10(b) is a block diagram of an HTTP PUT request.

FIG. 10(c) shows the structure of a URL.

FIGS. 14A, 14B, and 14C are flow charts showing the steps executed by the ProcessPageItem routine for generating ASCII output from a single Page Item in a Resource Object of Type TEXT.

DETAILED DESCRIPTION OF THE PREFERRED EMBODIMENTS

System Overview

Figure 1:
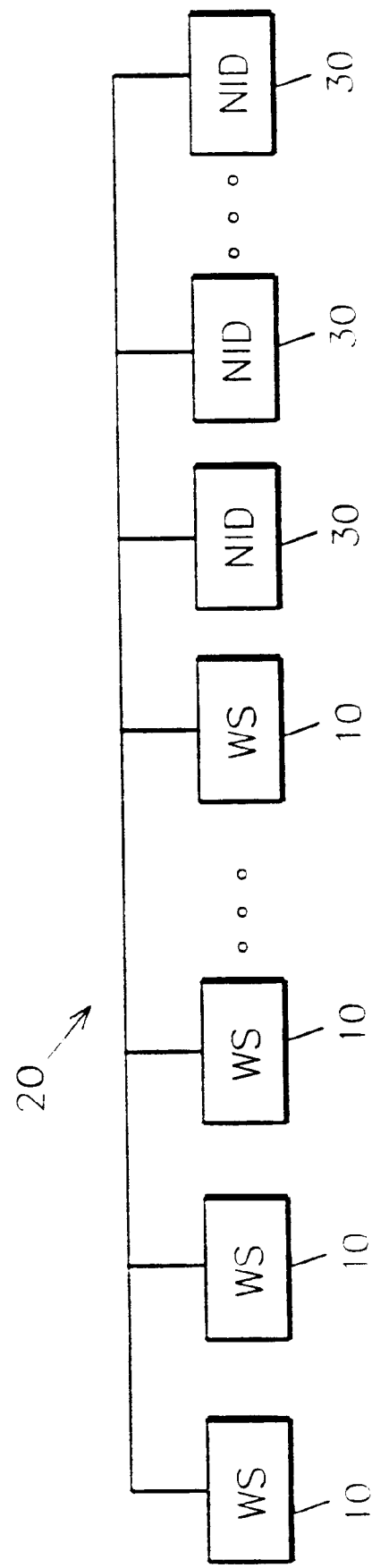
FIG. 1 is a block diagram of an intranet, showing one or more work stations connected to one or more nonstandard internal devices.

Shown in FIG. 1 is a simplified diagram of an intranet. At least one workstation 10 is connected via a network 20 to at least one non-standard internal device 30.

Figure 2:
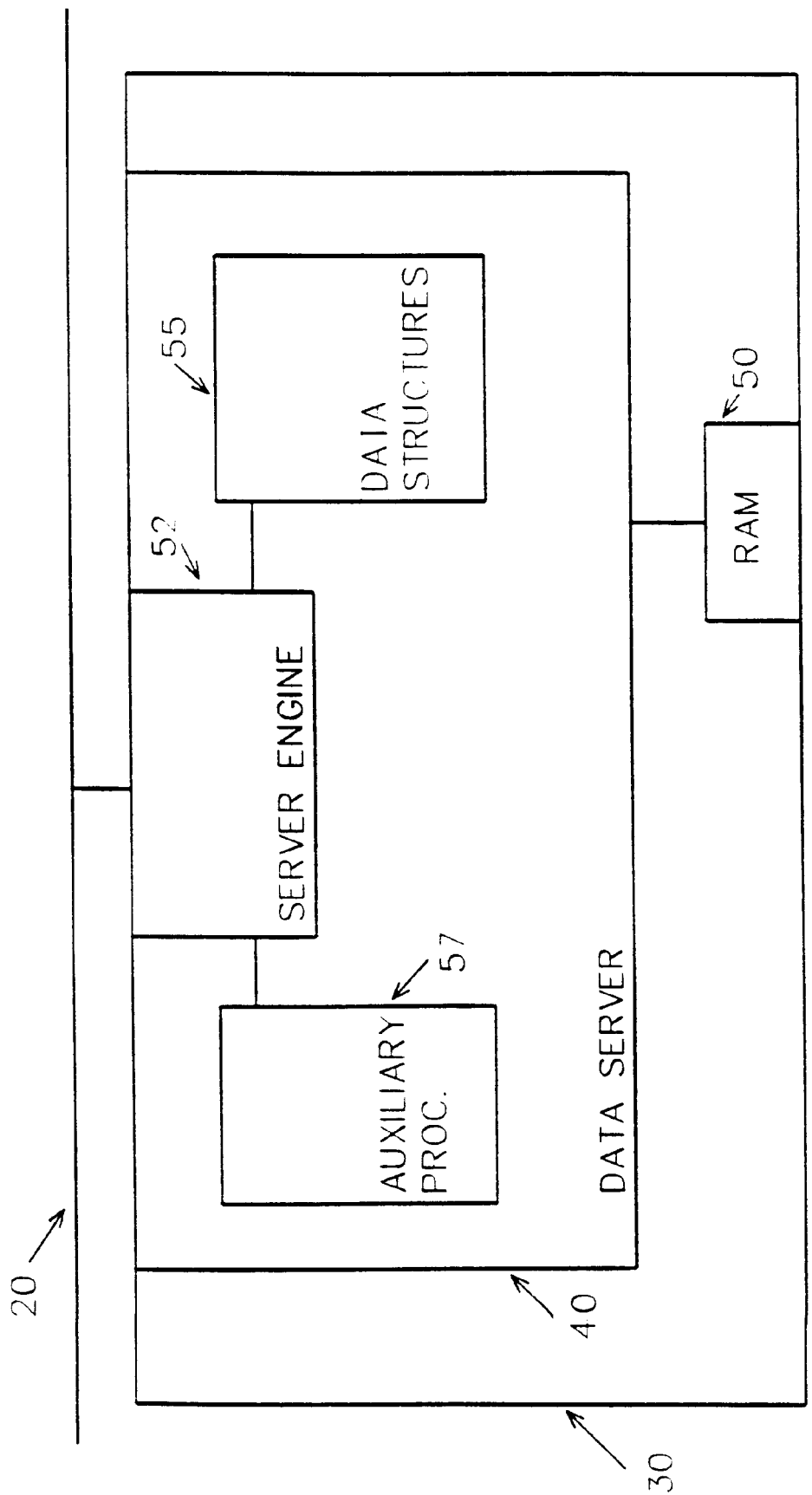
FIG. 2 is a block diagram of a non-standard internal device.

Shown in FIG. 2 is a simplified diagram of a non-standard internal device. The device 30 is connected to the network 20 through a data server 40. The data server is capable of reading and writing values to a parameter RAM 50, and sending and receiving data over the network. The data server comprises a server engine 52, a set of data structures 55, and a set of auxiliary procedures 57. In a preferred embodiment, the data server is stored in a programmable ROM.

Data Structures

In a preferred embodiment, the data server engine 52 is programmed in a high level compiled programming language such as C. The data structures 55 and auxiliary procedures 57 are also programmed in the same language. Each of the server engine, the data structures and the auxiliary procedures is compiled and linked together to form a single executable binary file.

Figure 3:
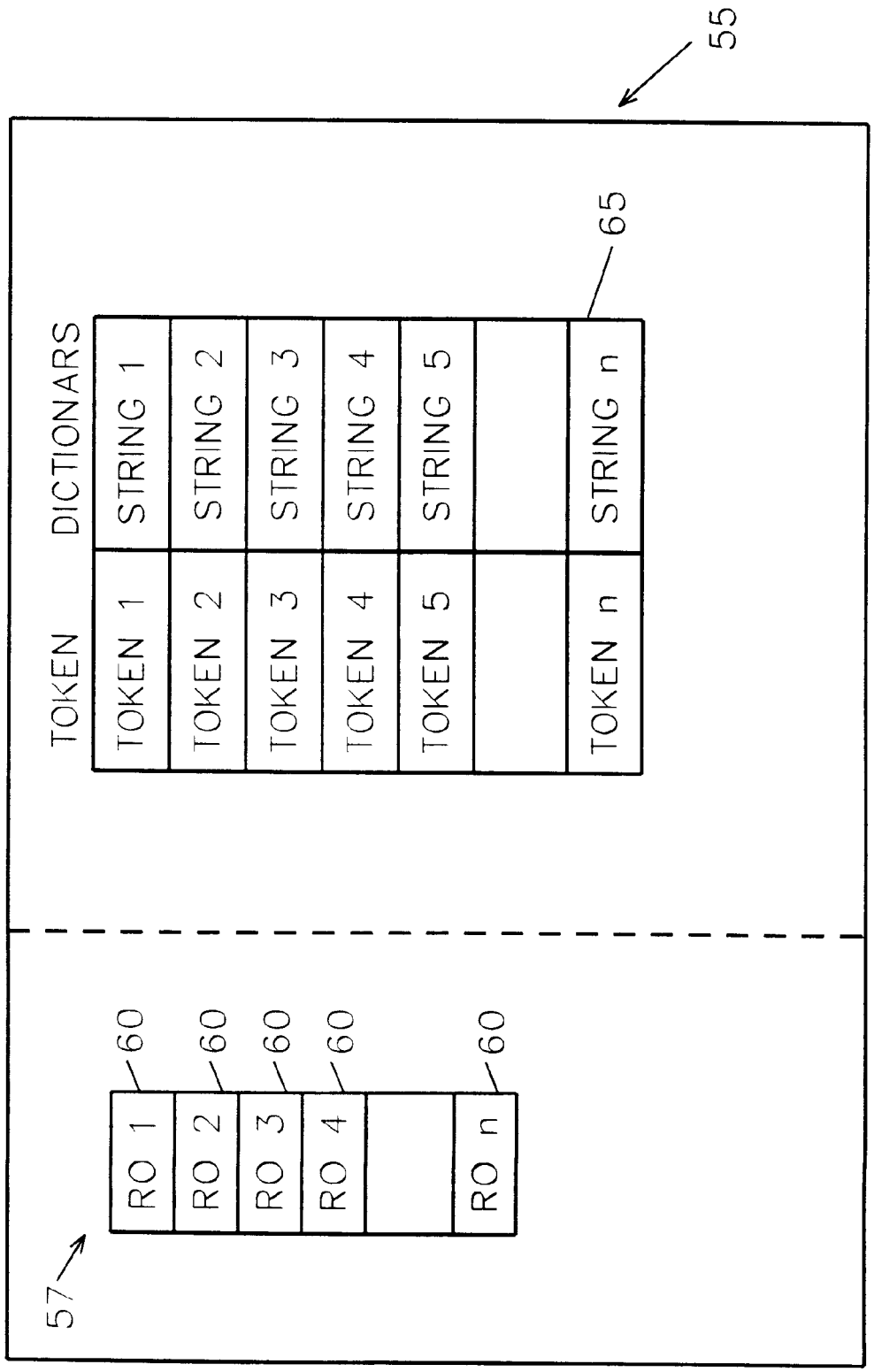
FIG. 3 is a block diagram of the data structures of the invention.

Shown in FIG. 3 is a simplified diagram of the data structures 55 of the data server. The data structures 55 comprise a list 57 of Resource Objects 60 and a Token Dictionary 65 consisting of pairings of Tokens and ASCII strings.

Figure 4:
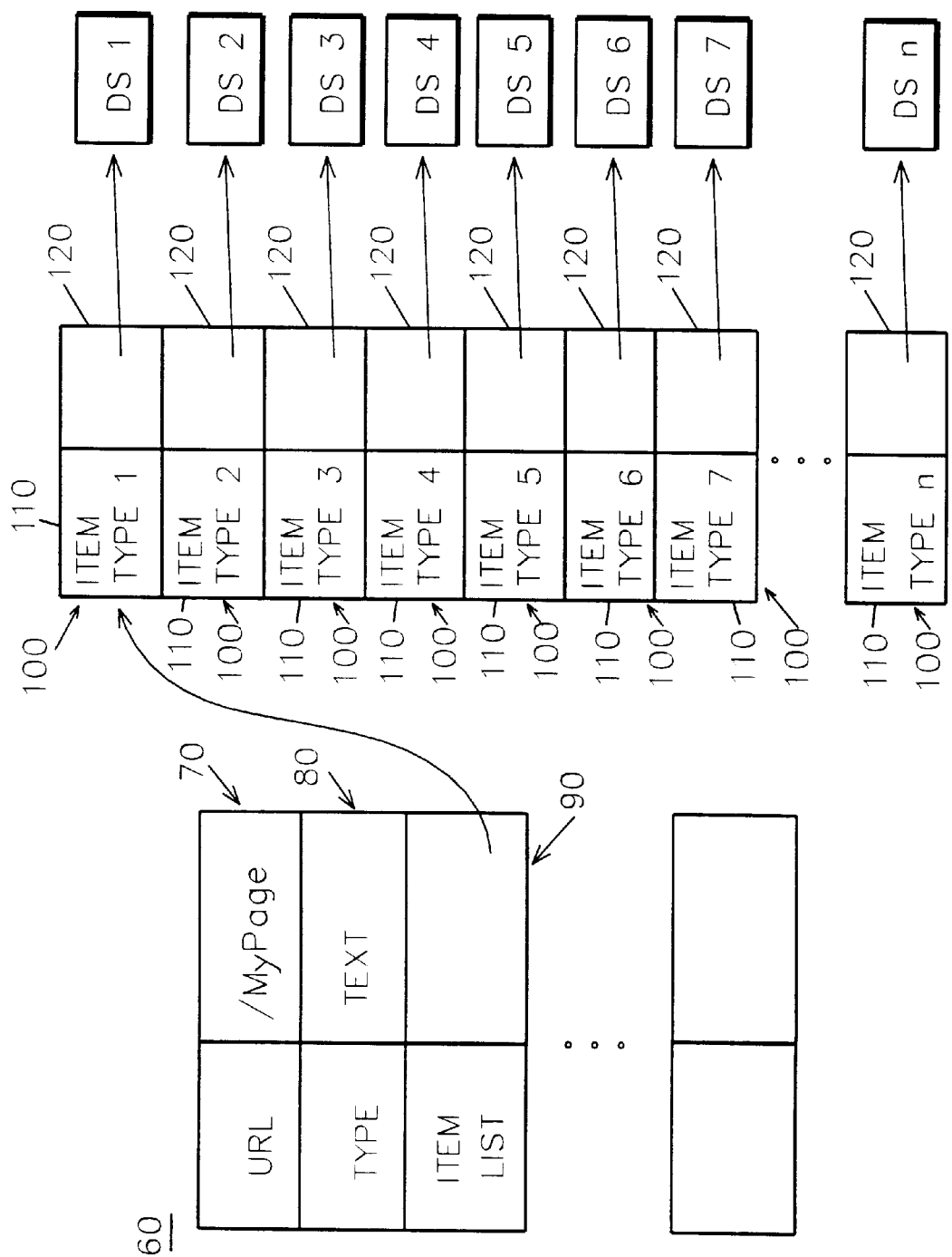
FIG. 4 is a block diagram of a Resource Object of Type TEXT.

Shown in FIG. 4 is a simplified diagram of a Resource Object 60. Each Resource Object has at least a URL field 70, a Type field 80, and an Item List 90. A Resource Object contains the information necessary for the data server to respond to an HTTP request directed to the given URL.

The data server of the invention recognizes at least two types of Resource Objects: TEXT and FORM. A Resource Object of type TEXT indicates the methods and data for generating textual data for transmission to a web browser. The implementation of other Resource Object types, corresponding to other types of data files (e.g. GIF, MPEG) often found on web sites, will be obvious to those skilled in the art of computer programming. When the data server engine receives an HTTP request containing a URL associated with a Resource Object of type TEXT, it responds by transmitting to the requesting web browser a sequence of HTML statements specified by the methods and data of the Resource Object.

A Resource Object of type FORM indicates methods for processing form data received from a web browser. When the data server engine receives an HTTP request containing a URL associated with a Resource Object of type FORM, it responds by processing the accompanying data according to methods specified by the Resource Object, and then transmitting back to the requesting web browser a sequence of data specified by the methods and data of another Resource Object.

Referring to FIG. 4, Item List 90 is a list of ordered pairs called Page Items 100. The first element 110 of each Page Item is an Item Type. The second element 120 of each Page Item is a pointer to a data structure. As is explained in more detail below, the Item Type determines how the data contained in the data structure is to be interpreted. The data server of the invention recognizes at least the following Item Types: STATIC DATA, FORM HEADER, FORM ELEMENT, DISPLAY TEXT, DYNAMIC DISPLAY, ITEM GROUP, REPEAT GROUP, REPEAT GROUP DYNAMIC, INDEX DISPLAY and QUERY DISPLAY.

In a Resource Object 60 of Type TEXT, information in each Page Item 100 in the Item List 90 is used by the data server engine to generate a data fragment (e.g. an ASCII string) which will constitute part of the web page information transmitted to the requesting web browser. The TEXT file represented by the Resource Object 60 corresponds to the concatenation of all such data fragments produced by the data server engine from the Page Items 100 in the Item List 90.

Figure 5:
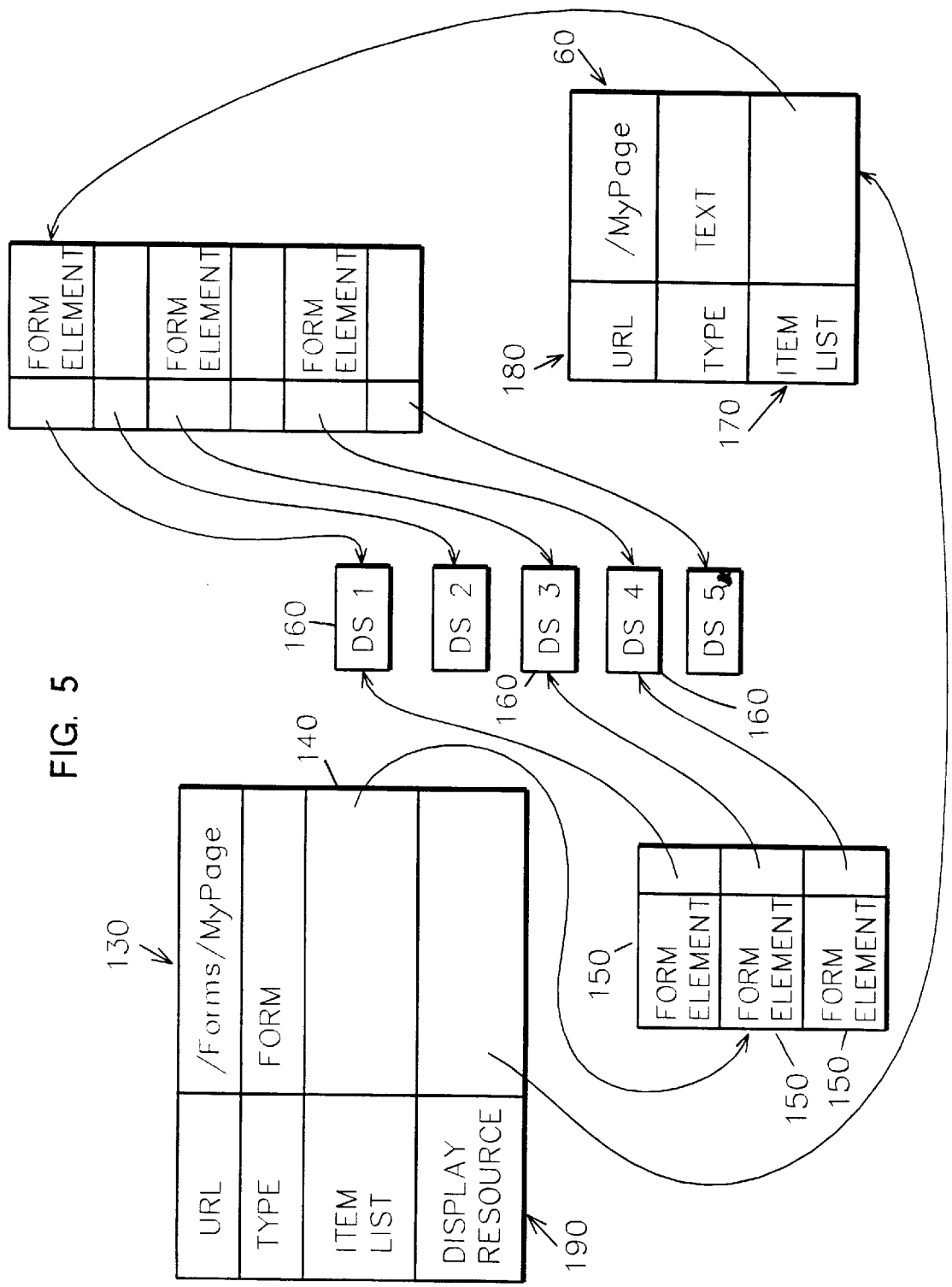
FIG. 5 is a block diagram of a Resource Object of Type FORM and Resource Object of Type TEXT sharing common data structures.

Referring to FIG. 5, a Resource Object 130 of Type FORM contains data instructing the data server engine how to process form data received from a web browser (i.e. data which a user has entered in response to the display of an HTML form by the user's web browser). The Item List 140 of the Resource Object 130 comprises a set of Page Items 150, each having an Item Type of FORM ELEMENT. The data structures 160 pointed to by the Item List 140 are also among the data structures associated with the Item List 170 of a Resource Object 180 of type TEXT. In general, a single data structure representing a given data fragment may be "reused" as an element of multiple Resource Object by having pointers within those Resource Objects point to it.

The Resource Object 130 of type FORM has a Display Resource field 190, which points to a Resource Object representing a web page to be displayed after the form data has been processed by the data server. In the example of FIG. 5, the Display Resource 190 points to the Resource Object 60, representing the same web page of which the HTML form represented by Resource Object 190 is a part.

Figure 6:
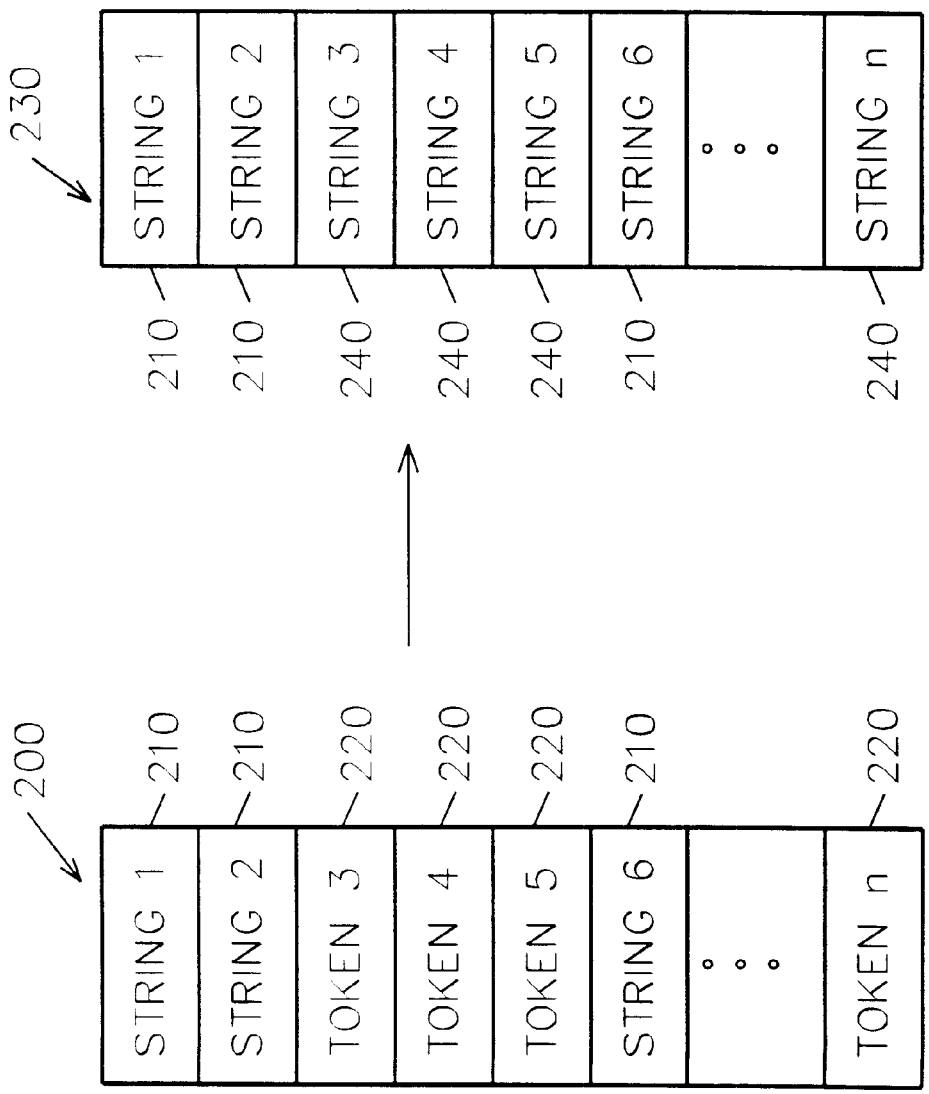
FIG. 6 is a diagram illustrating the substitution of Tokens with ASCII strings according to the invention.

The simplest Page Item recognized by the data server is of type STATIC DATA. Referring to FIG. 6, the data structure 200 associated with this Item Type will contain a sequence of ASCII strings 210 and/or Tokens 220 corresponding to ASCII strings. When a STATIC DATA Page Item is encountered, the data server engine generates an ASCII string 230 comprising the concatenation of the ASCII strings 210 of the data structure 200 with the ASCII strings 240 corresponding, in the Token Dictionary 65, to the Tokens of the data structure 200. Memory usage can be reduced significantly by representing commonly used strings in a tokenized fashion.

Referring to FIGS. 7(a) and 7(b), the data structure 260 associated with a FORM HEADER Page Item is a Resource Object of Type FORM 260. When a FORM HEADER Item Type is encountered, the data server engine generates an ASCII string 270 comprising an HTML "FORM" statement, with the ACTION field of said statement 280 set equal to the URL 290 specified by said Resource Object of Type FORM 260.

Referring to FIGS. 8(a) and 8(b), the data structure 310 associated with a FORM ELEMENT Page Item 300 will contain information specifying a Type of HTML form element 320 and an associated Name 330 for the element, along with additional data specifying parameters such as size. The data structure may also specify a Get Method 340 and a Put Method 350. If present, the Get Method 340 is used to determine the default or current value of the form element. If present, the Put Method 350 is used to process user inputs to the form element received from a web browser. As illustrated in FIG. 5, a Page Item of type FORM ELEMENT will typically be a component of two Resource Objects. One will be a Resource Object of Type TEXT 60, representing the web page of which the form element is a part. The other will be a Resource Object of Type FORM 130, representing the methods for responding to the receipt of form data entered on the web page by a user.

In the example illustrated in FIGS. 8(a), 8(b) and 8(c), the data structure 310 represents a form element of Type "text", with a Name "MyText". When such a data structure is encountered by the data server engine while processing a Resource Object of Type TEXT, the resulting ASCII string 360 generated by the data server engine is an HTML INPUT statement with TYPE 362 and NAME 364 fields set according to the values of Type 320 and Name 330 in the data structure 310, and the VALUE attribute 366 determined by executing the Get Method TextFormGetMethod 370.

When a FORM ELEMENT Page Item 300 is encountered by the data server engine while processing the Item List of a Resource Object of Type FORM, it indicates the existence of a process for processing form data associated with the form element it represents. Thus, when the data server has received form data 380 from a web browser, each name=value pair in the form data is checked to see if there is a FORM ELEMENT Page Item with a Name field 330 equal to the name 387 of the name=value pair. If such a match is found, the value 400 of the name=value pair is processed by applying the method 420 specified by the Put Method field 350 of the data structure 310 to it 410.

The data structure associated with a DISPLAY TEXT Page Item specifies an Instance Method. When a DISPLAY TEXT Page Item is encountered, the data server engine executes the Instance Method and generates an ASCII string determined by the Instance Method.

The data structure associated with a DYNAMIC DISPLAY Page Item will contain an Item List (itself pointing to one or more Page Items), and will specify a Choice Method for choosing from among the Page Items of the Item List. When the data server engine encounters a DYNAMIC DISPLAY Item Type, it executes the Choice Method specified by the Page Item and creates an ASCII string by processing the particular Page Item specified by the Choice Method.

The data structure associated with an ITEM GROUP Item Type will be an Item List. When the data server engine encounters an ITEM GROUP Item Type, it generates an ASCII string for each Page Item in the associated Item List.

Figure 9A:
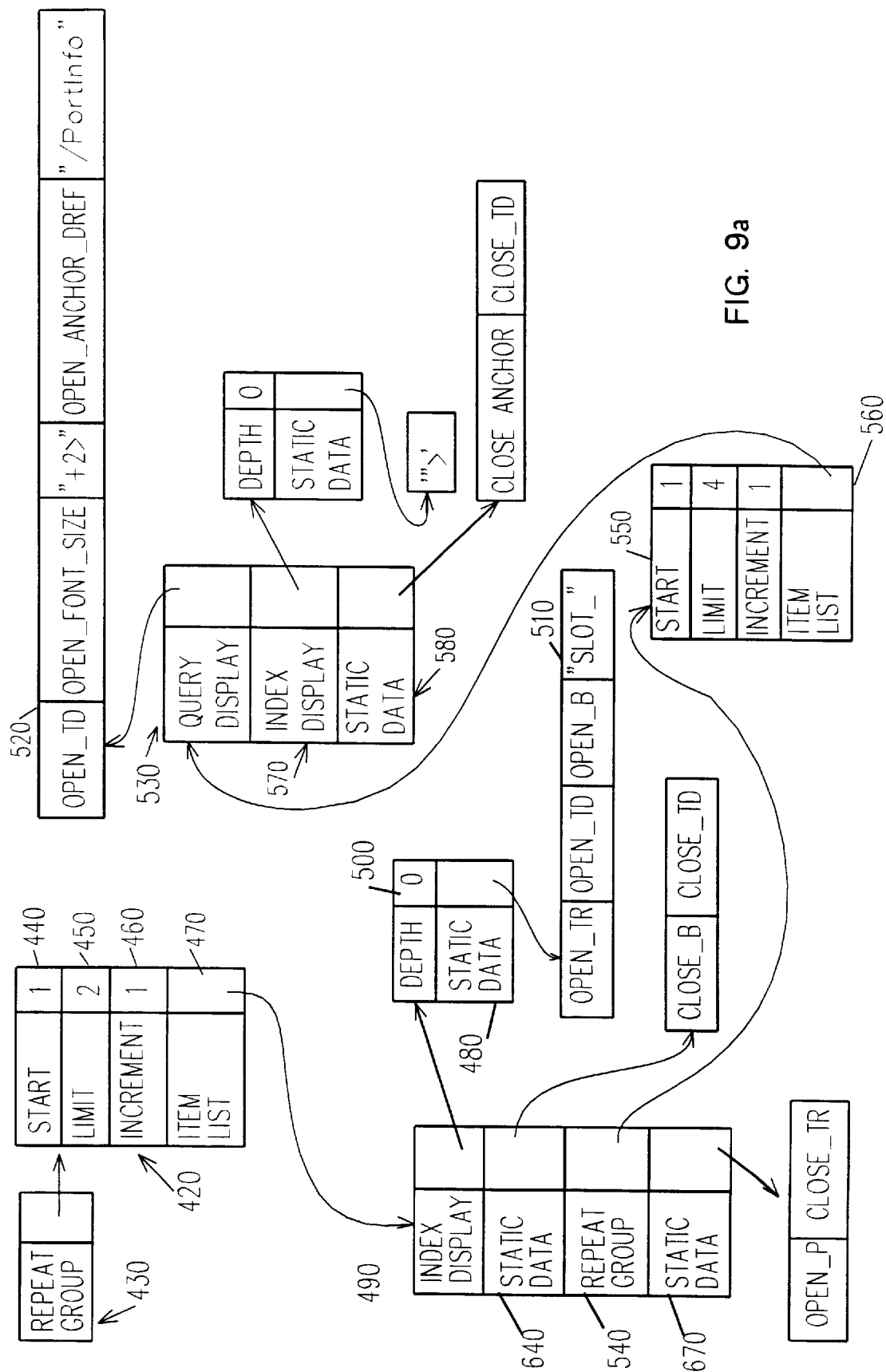
FIG. 9(a) is a block diagram of a Page Item of Type Repeat Group.

Referring to FIG. 9(a), the data structure 420 associated with a REPEAT GROUP Page Item 430 includes a Start Value 440, a Limit Value 450, an Increment Value 460, and an Item List 470. When the data server engine encounters a REPEAT GROUP Item Type, it performs the following steps. First, it increments a global variable IndexDepth by one. It then sets the value of a global variable RepeatIndex [IndexDepth] to be equal to the Start Value 440. It then generates ASCII strings as specified by each of the Page Items on the Item List 470 and then increments RepeatIndex [IndexDepth] by Increment Value 460. If RepeatIndex [IndexDepth] is less than or equal to the Limit Value 450, the process is repeated.

The data structure associated with a REPEAT GROUP DYNAMIC Page Item specifies an Initialization Method and includes an Item List. When encountered by the data server engine, it is treated identically to a REPEAT GROUP Page Item, except that the Start, Limit and Increment values are set by the specified Initialization Method.

The data structure 480 associated with an INDEX DISPLAY Page Item 490 specifies a Depth 500 (which is a number) and a sequence of ASCII strings and/or Tokens corresponding to ASCII strings 510. When the data server engine encounters an INDEX DISPLAY Page Item, it processes the sequence of ASCII strings and/or Tokens in the same fashion as a STATIC DATA Page Item and appends to the end of the resulting string the current value of the global variable RepeatIndex[IndexDepth-Depth]. Use of the INDEX DISPLAY Page Item enables the insertion of the index of a (possibly nested) repeat group into a sequence of web page data.

The data structure 520 associated with a QUERY DISPLAY Page Item 530 contains a sequence of strings of ASCII characters and/or Tokens corresponding to ASCII strings. When the data server engine encounters an QUERY DISPLAY Page Item, it processes the sequence of ASCII strings and/or Tokens in the same manner as a STATIC DATA Page Item and appends to the end of the resulting string a "?", followed by the numerical values of the global array RepeatIndex[] separated by commas, for all array values with indices less than or equal to the global variable IndexDepth. This Item Type permits construction of HTML statements of the form <A HREF="URL?i,j,k"> where i, j, and k are the values of RepeatIndex[] for nested Page Items of type REPEAT GROUP or REPEAT GROUP DYNAMIC. Such a construction creates a hypertext link which, when selected by the user, generates an HTTP GET message with the stated URL and additional data of "i,j,k". If the URL is associated with a Resource Object of type TEXT, the data server of the invention uses the values of i,j and k to set the values of the RepeatIndex[] array. These values are thus available to be used by any methods specified in Page Items of the specified TEXT Resource Object.

FIG. 9(b) illustrates the sequence of HTML statements generated by the data server engine after processing the REPEAT GROUP Page Item 430 illustrated in FIG. 9(a). (Note that line breaks are ordinarily ignored in HTML, and are inserted in FIG. 9(b) solely for the sake of readability.

The data structure 420 of REPEAT GROUP Page Item 430 defines an outer loop in which Item List 490 is evaluated two times. Within Item List 490 is REPEAT GROUP Page Item 540, the data structure 550 of which defines an inner loop in which Item List 560 is evaluated four times. Evaluation of Item List 560 entails evaluation of each of its constituent Page Items, starting with QUERY DISPLAY Page Item 530. Evaluation of this Page Item results in a set of ASCII strings 600 of the form:

<TD><FONT SIZE=+2><A HREF="PortInfo?i,j where i is the RepeatIndex[] value for the outer loop defined by data structure 420 and j is the RepeatIndex[] value for the inner loop defined by data structure 550.

Evaluation of INDEX DISPLAY Page Item 570 within Item List 560 results in a set of ASCII strings 610 of the form:

">j where j is the RepeatIndex[] value for the inner loop defined by data structure 550.

Evaluation of STATIC DATA Page Item 580 within Item List 560 results in a set of ASCII strings 620:

</A></TD>

Evaluation of Item List 470 entails evaluation of each Page Item thereon, starting with INDEX DISPLAY Page Item 490. Evaluation of this Page Item results in a set of ASCII strings 630 of the form:

<TR><TD><B>Slot i where i is the RepeatIndex[] value for the outer loop defined by data structure 420. Evaluation of the STATIC DATA Page Item 640 results in a set of ASCII strings 650:

</B></TD>

Evaluation of REPEAT GROUP Page Item 540 results, as described above, in a set of ASCII strings 660, each described by the Page Items in Item List 560. Evaluation of STATIC DATA Page Item 670 results in a set of ASCII strings 680:

<P></TR>

As this example illustrates, the data server of the invention is able to generate the entire set of HTML statements illustrated in FIG. 9(b) based on stored data representing parameterized instances of the statements plus parametric data, thereby using significantly less memory than would be required by a conventional data server to generate the same sequence of HTML statements.

Serving

The data server receives HTTP GET and POST requests from workstations on the network. FIG. 10(a) shows a simplified diagram of an HTTP GET request. It comprises a GET code 700 and a uniform resource locator (URL) 710. FIG. 10(b) shows a simplified diagram of an HTTP POST request. It comprises a POST code 720, a uniform resource locator (URL) 730, and a data block 740. FIG. 10(c) shows a simplified diagram of a URL. It is an ASCII string comprising a resource identifier 750, optionally followed by a question mark 760, optionally followed by supplemental data 770.

Figure 11:
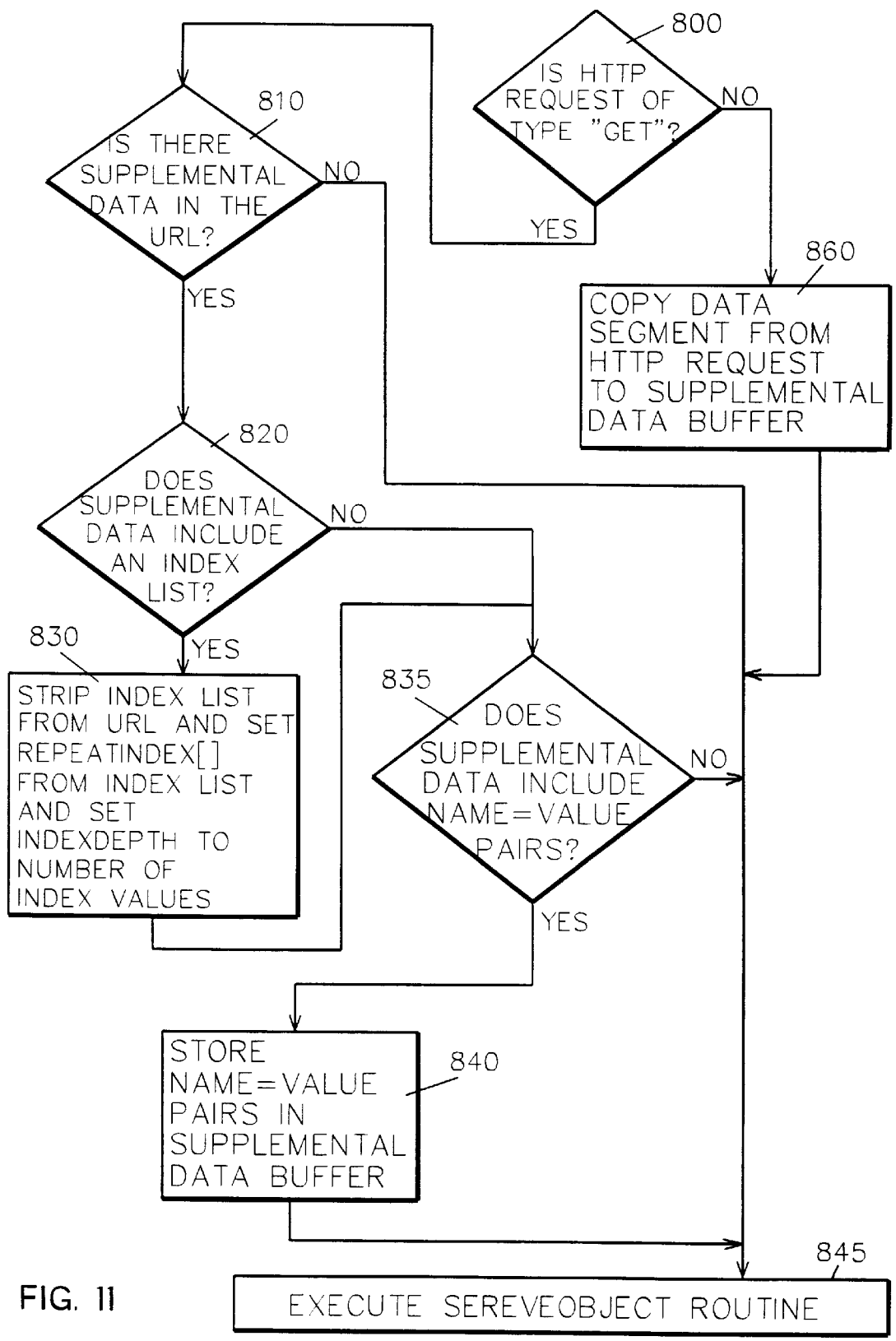
FIG. 11 is a flow chart showing the steps executed by the data server of the invention when processing an HTTP request.

FIG. 11 shows the steps taken by the data server upon receipt of an HTTP request from a workstation. First, the request type is checked to see if it is an HTTP GET request(step 800). If it is an HTTP GET request, the URL is checked to determine whether there is supplemental data after the resource identifier (step 810). If there is such supplemental data, the supplemental data is checked to determine whether the data includes an "indexlist" (where an indexlist is a sequence of one or more numerical values separated by comma) (step 820). If so, this data is removed from the URL and the values of the global array RepeatIndex[] are set according to the numerical values and the global variable IndexDepth is set to equal the number of such values so set (step 830). Next the supplemental data is checked to determine if it includes name=value pairs (i.e. form data) (step 835). (These may be present in addition to or instead of indexlist data). If so, the name=value data is stored in a supplemental data buffer (step 840). In either case, the routine ServeObject is then executed (step 850).

If the HTTP request is a POST request, the data block from the POST request is copied into a Supplemental Data Buffer (step 860). The routine ServeObject is then executed (step 850).

Figure 12:
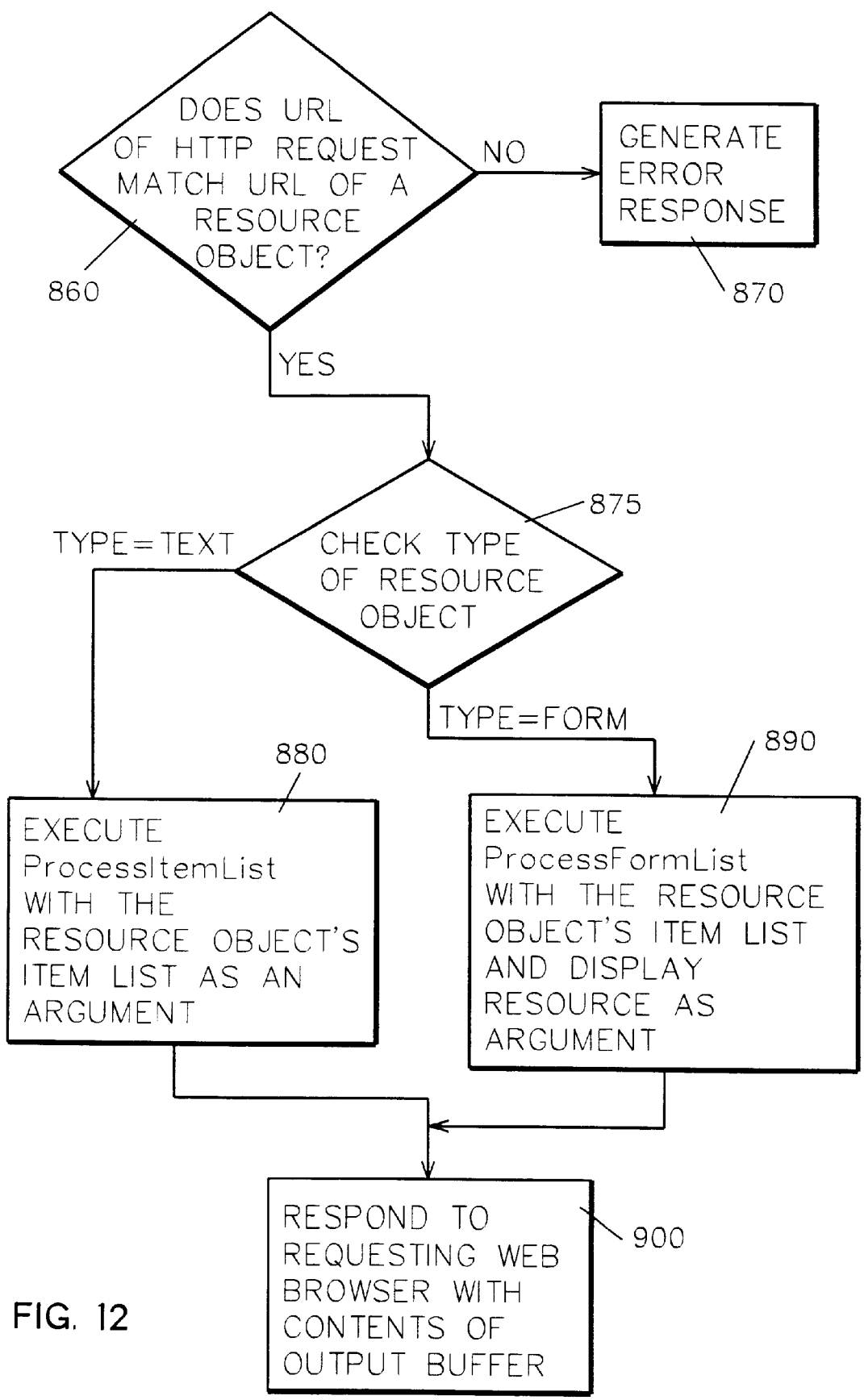
FIG. 12 is a flow chart showing the steps executed by the ServeObject routine to respond to a HTTP request.

FIG. 12 shows the steps taken by the ServeObject routine. Referring also to FIGS. 3, 10(a) and 10(b), the Resource Object list 57 is scanned to determine whether the URL 70 of any of the Resource Objects 60 matches the URL 710 or 730 of the HTTP request (step 860). If no such Resource Object is found, an error response is generated (step 870). If such a Resource Object is found, its Type 80 is checked (step 875). If the Type is TEXT, the routine ProcessItemList is executed with Item List 90 as an argument(step 880). If the Type is FORM, the routine ProcessFormList is executed with Item List 140 and Display Resource 190 as arguments (step 890). In either case, the resulting output buffer is transmitted back to the requesting workstation via an HTTP response message (step 900).

Figure 13:
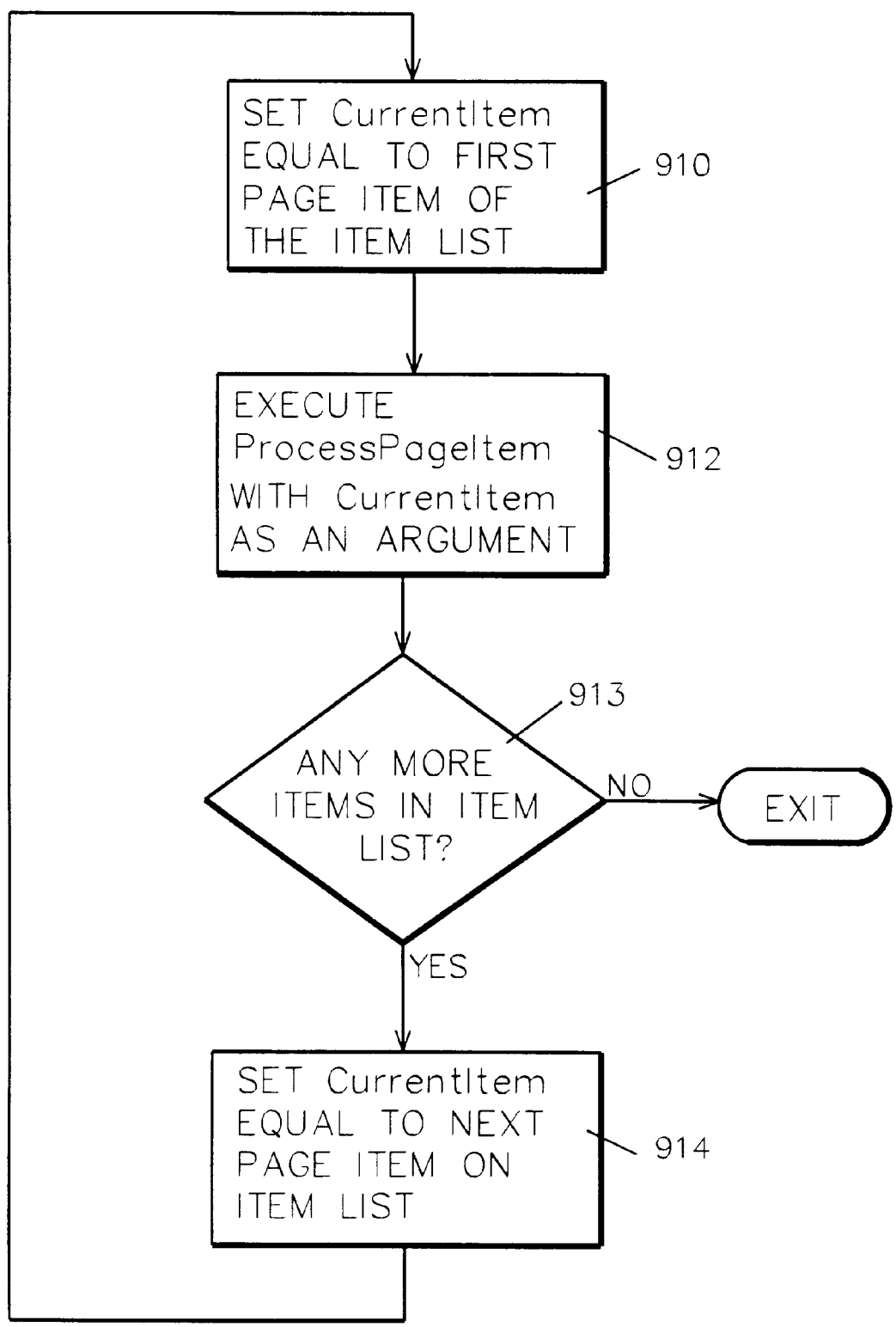
FIG. 13 is a flow chart showing the steps executed by the ProcessItemList routine to process the items on an the Item List of a Resource Object of Type TEXT.

FIG. 13 shows the steps taken by the ProcessItemList routine. A pointer CurrentItem is set to the first Page Item in the Item List (step 910). The routine ProcessPageItem is called with CurrentItem as an argument (step 912). The Item List is then checked for additional Page Items (step 913), and if there are additional Page Items CurrentItem is then set to the next Page Item in the Item List and the process is repeated (step 914). Otherwise the routine exits.

Figure 14B:
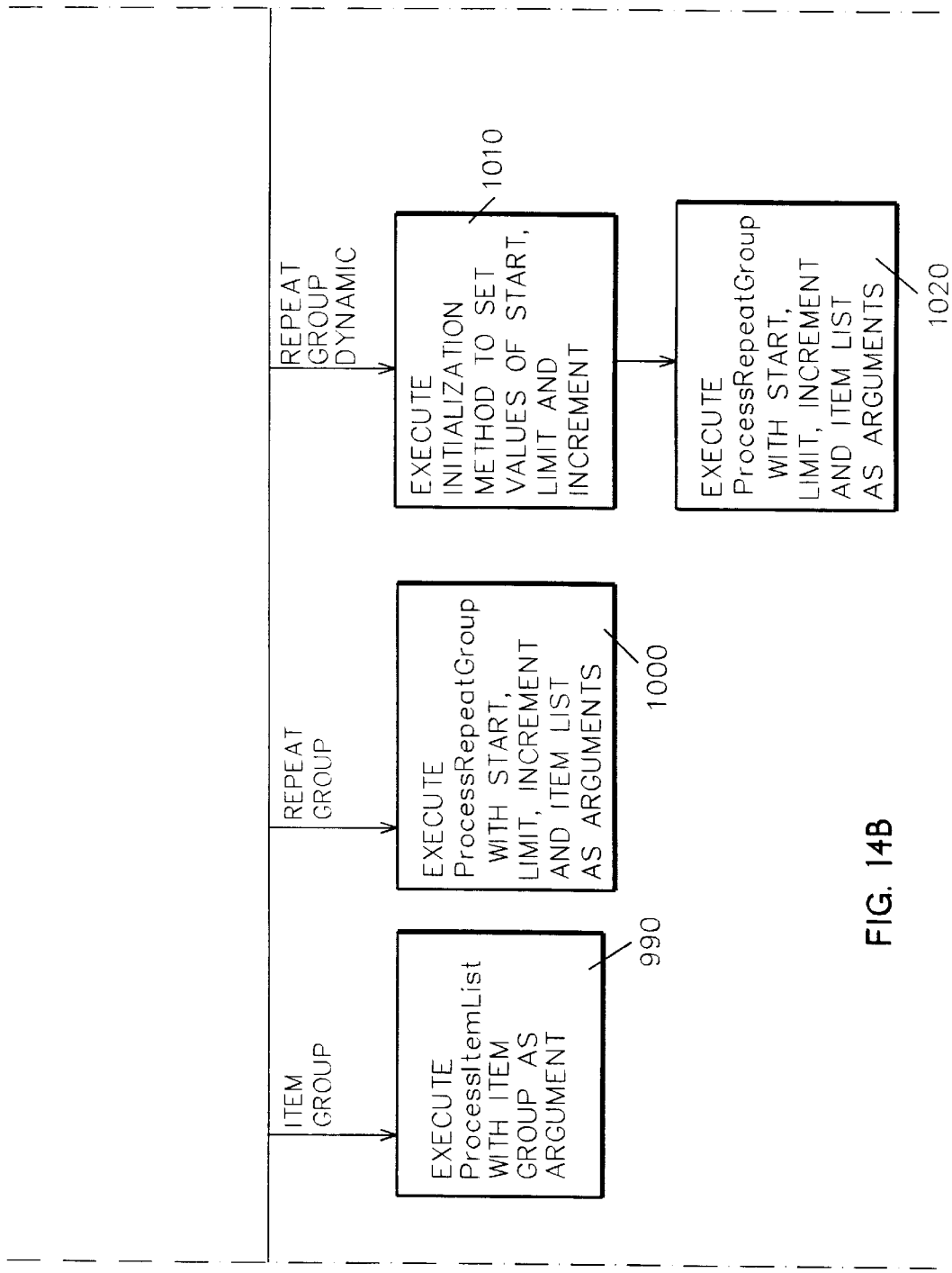
Figure 14C:
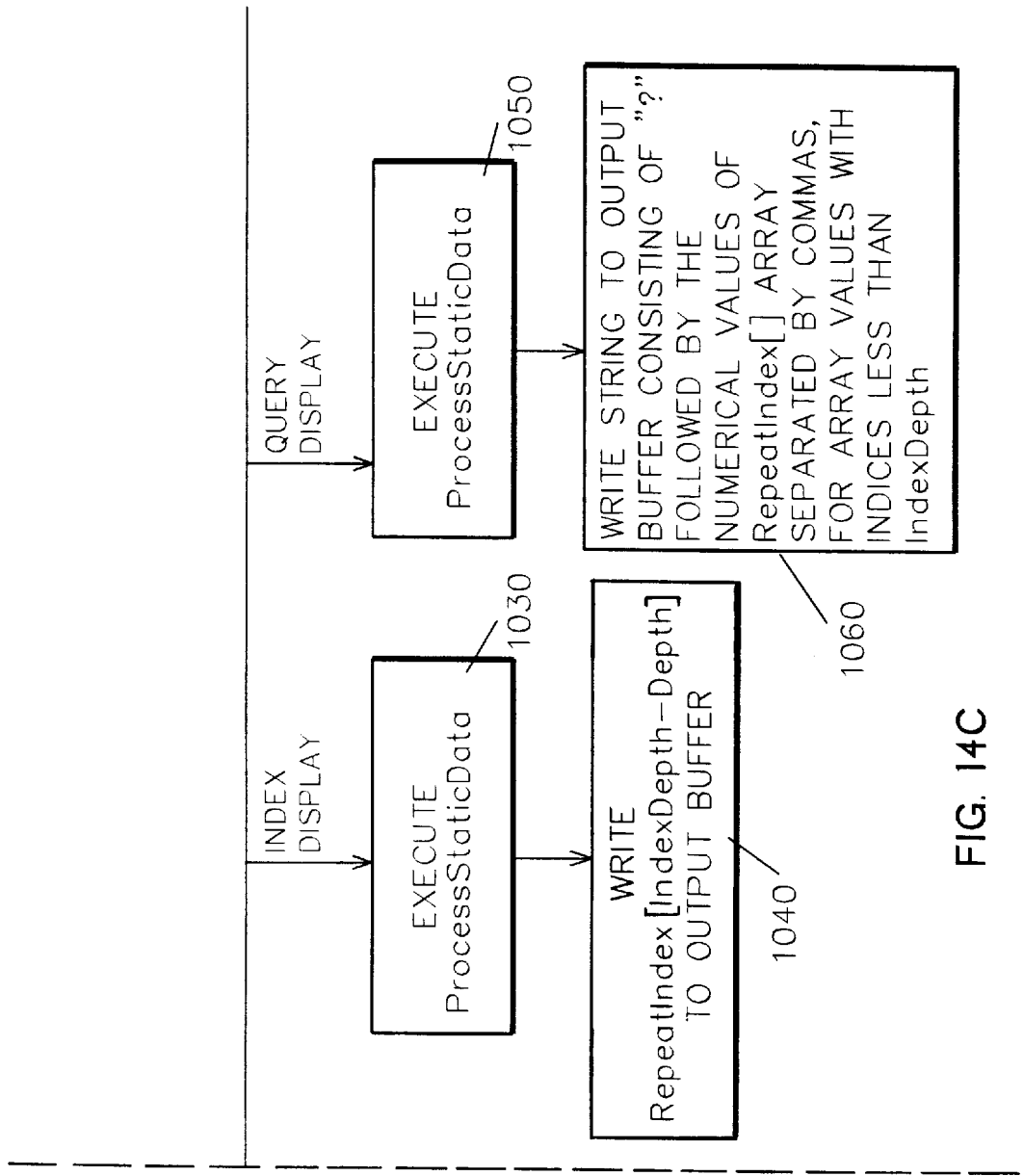

FIG. 14 shows the steps taken by the ProcessPageItem routine. The Type of the Page Item is tested (step 918). If the Page Item is of type STATIC DATA, the routine ProcessStaticData is executed with the data structure of the Page Item as an argument (step 920).

If the Page Item is of type DISPLAY TEXT, the Instance Method indicated by the data structure is executed to provide an ASCII string (step 930). This ASCII string is written to the output buffer (step 940).

Referring also to FIGS. 7(*a*) and 7(*b*), if the Page Item is of type FORM HEADER, an HTML FORM statement 270 is generated, with the FORM statement's ACTION field 280 set equal to the URL 290 of Resource Object 260 (step 950).

Referring also to FIGS. 8(*a*) and 8(*b*), if the Page Item is of type FORM ELEMENT, an HTML statement 360 corresponding to the Type field 320 of the data structure 310 is generated, with a NAME field 362 equal to the Name 330 of the data structure 310 and a value, if any, determined by the output of the Get Method 340 of the data structure 310 (step 960).

If the Page Item is of type DYNAMIC DISPLAY, the Choice Method is used to select one Page Item from the data structure (step 970). The routine ProcessPageItem is then called recursively with this selected Page Item as an argument (step 980).

If the Page Item is of type ITEM GROUP, the routine ProcessItemList is executed recursively, with the Item Group as its argument (step 990).

If the Page Item is of type REPEAT GROUP, the routine ProcessRepeatGroup is called recursively with Start Value, Limit Value, Increment Value, and a pointer to the Item List of the data structure as arguments (step 1000).

If the Page Item is of type REPEAT GROUP DYNAMIC, the Initialization Method is executed to generate a start value, a limit value, and an increment value (step 1010). The routine ProcessRepeatGroup is then called with these values, along with a pointer to the Item List of the data structure, as arguments (step 1020).

Referring also to FIG. 9(*a*), if the Page Item 490 is of type INDEX DISPLAY, the routine ProcessStaticData is executed with the static data 510 of the data structure as an argument (step 1030). Then, using the value Depth 500 indicated in the data structure, ASCII text corresponding to the value of RepeatIndex[IndexDepth-Depth] is written to the output buffer (step 1040).

If the Page Item 530 is of type QUERY DISPLAY, the routine ProcessStaticData is called with the data structure 520 as an argument (step 1050). An ASCII string is then written to the output buffer consisting of a "?", followed by the numerical values of the global array RepeatIndex[ ] separated by commas, for all array values with indices less than or equal to the global variable IndexDepth (step 1060).

Figure 15:
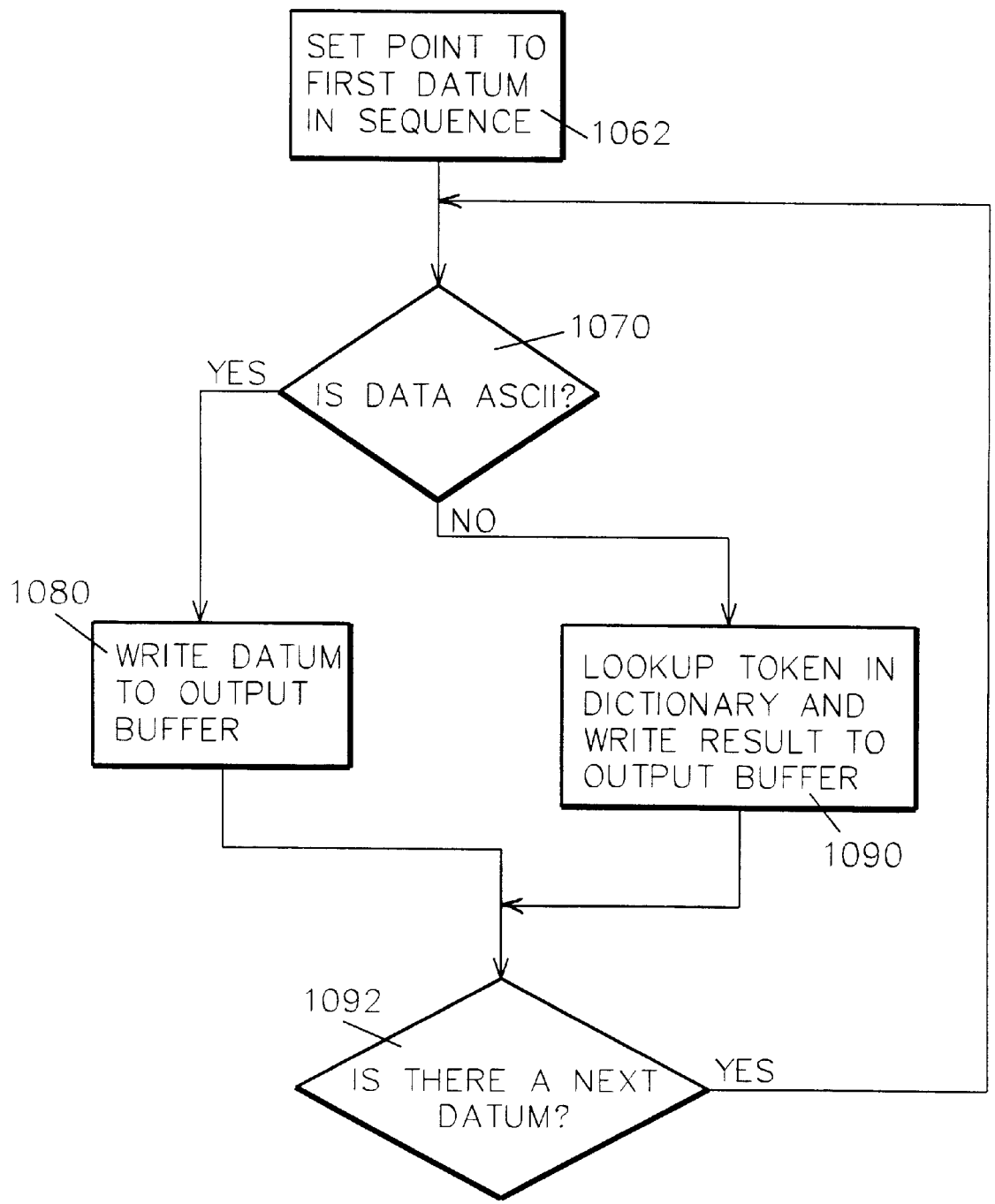
FIG. 15 is a flow chart showing the steps taken by the routine ProcessStaticData for converting static data into an ASCII string.

FIG. 15 shows the steps taken by the routine ProcessStaticData. A pointer is set to the first datum in the sequence of ASCII strings and Tokens (step 1062). The type of the datum is checked (step 1070). If the datum is an ASCII string, it is written to the output buffer (step 1080). If the datum is a token, the ASCII string associated with the Token in the Dictionary is written to the output buffer (step 1090). If there remain more data in the sequence (step 1092) control returns to step 1070.

Figure 16:
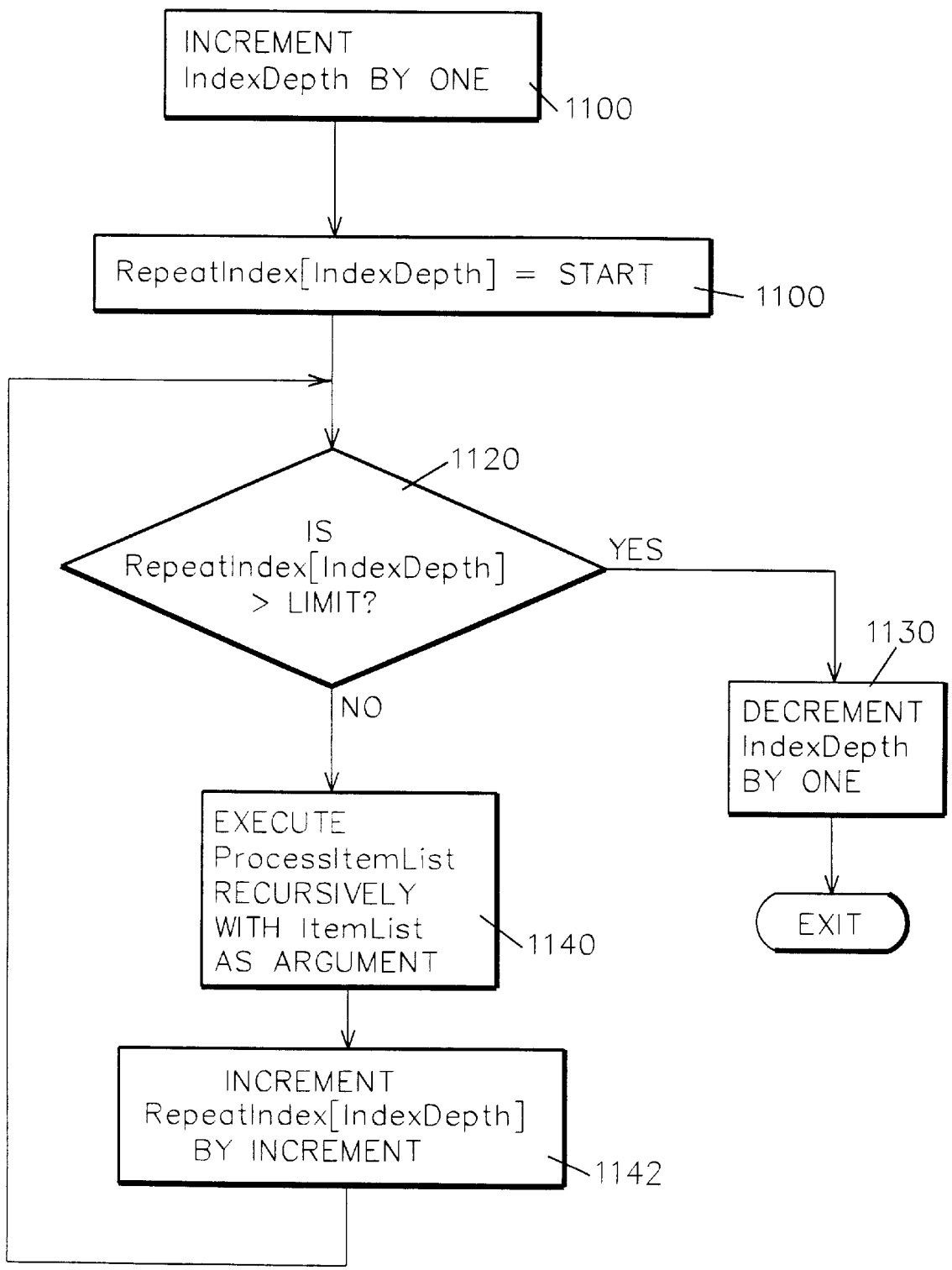
FIG. 16 is a flow chart showing the steps taken by the routine ProcessRepeatGroup for generating multiple instances of parameterized data in a Page Item of type REPEAT GROUP or REPEAT GROUP DYNAMIC.

FIG. 16 shows the steps taken by the routine ProcessRepeatGroup. The variables Start, Limit, Increment, and Item List are received as arguments. The value of the global variable IndexDepth is incremented by one (step 1100). The value of the global variable RepeatIndex[IndexDepth] is set to Start (step 1110). RepeatIndex[IndexDepth] is compared to the Limit (step 1120). If Limit is less than RepeatIndex[IndexDepth] then the IndexDepth is decremented by one and the routine exits (step 1130). If Limit is not less than RepeatIndex[IndexDepth] then the routine ProcessItemList is called recursively with the Item List as an argument (step 1140). The value of the global variable RepeatIndex[IndexDepth] is then incremented by Increment (step 1142) and control returns to step 1120.

Figure 17:
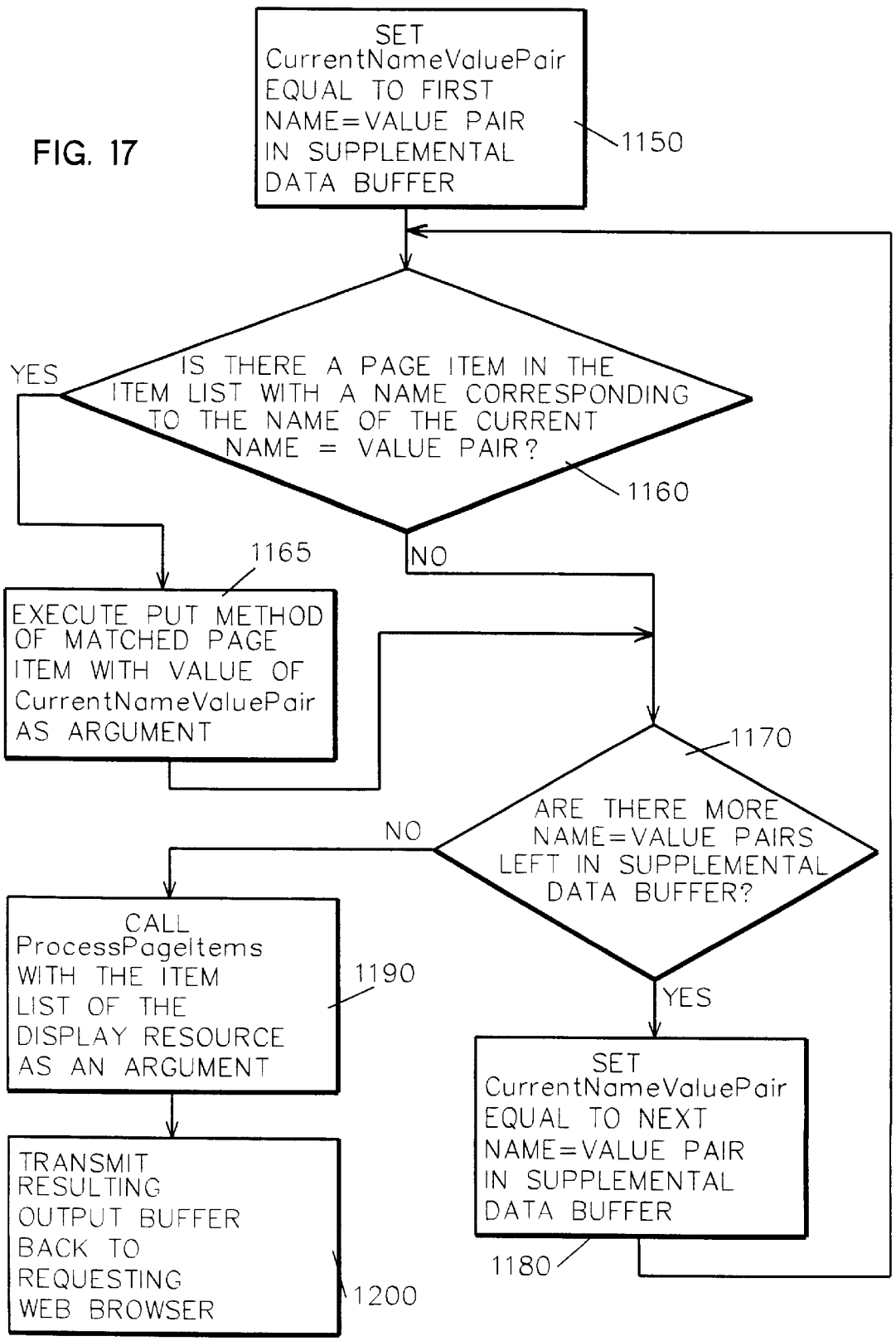
FIG. 17 is a flow chart showing the steps taken by the routine ProcessFormList to process form data received from a web browser.

FIG. 17 shows the steps taken by the routine ProcessFormList. Referring also to FIGS. 5, 8(*a*) and 8(*b*), the pointer CurrentNameValuePair is set to the first name=value pair 385 in the Supplemental Data Buffer 380 (step 1150). Each Page Item on the Item List 140 is scanned to see whether there is a Page Item with a Name 330 corresponding to the name 387 of CurrentNameValuePair (step 1160). If there is, the Put Method 350 of the matched Page Item is executed with the value of CurrentNameValuePair as an argument (step 1165). The Supplemental Data Buffer 380 is checked to see if any additional name=value pairs remain to be processed (step 1170). If so, CurrentNameValuePair is then set equal to the next name=value pair in the Supplemental Data Buffer (step 1180) and control returns to step 1160. When there are no more name=value pairs, the routine ProcessItemList is called with the Item List 170 of the Display Resource 190 as an argument (step 1190), and the resulting output buffer is transmitted back to the requesting workstation via an HTTP response message (step 1200).

Mailing

The data server is also capable of receiving "mail signals." A "mail signal" may be generated by a hardware mechanism within the non-standard device (for example a heat sensor), or by a software module (for example a put method, or a system scheduler module). A mail signal may also be generated in response to the receipt of a message from the intranet, for example an email message.

Figure 18:
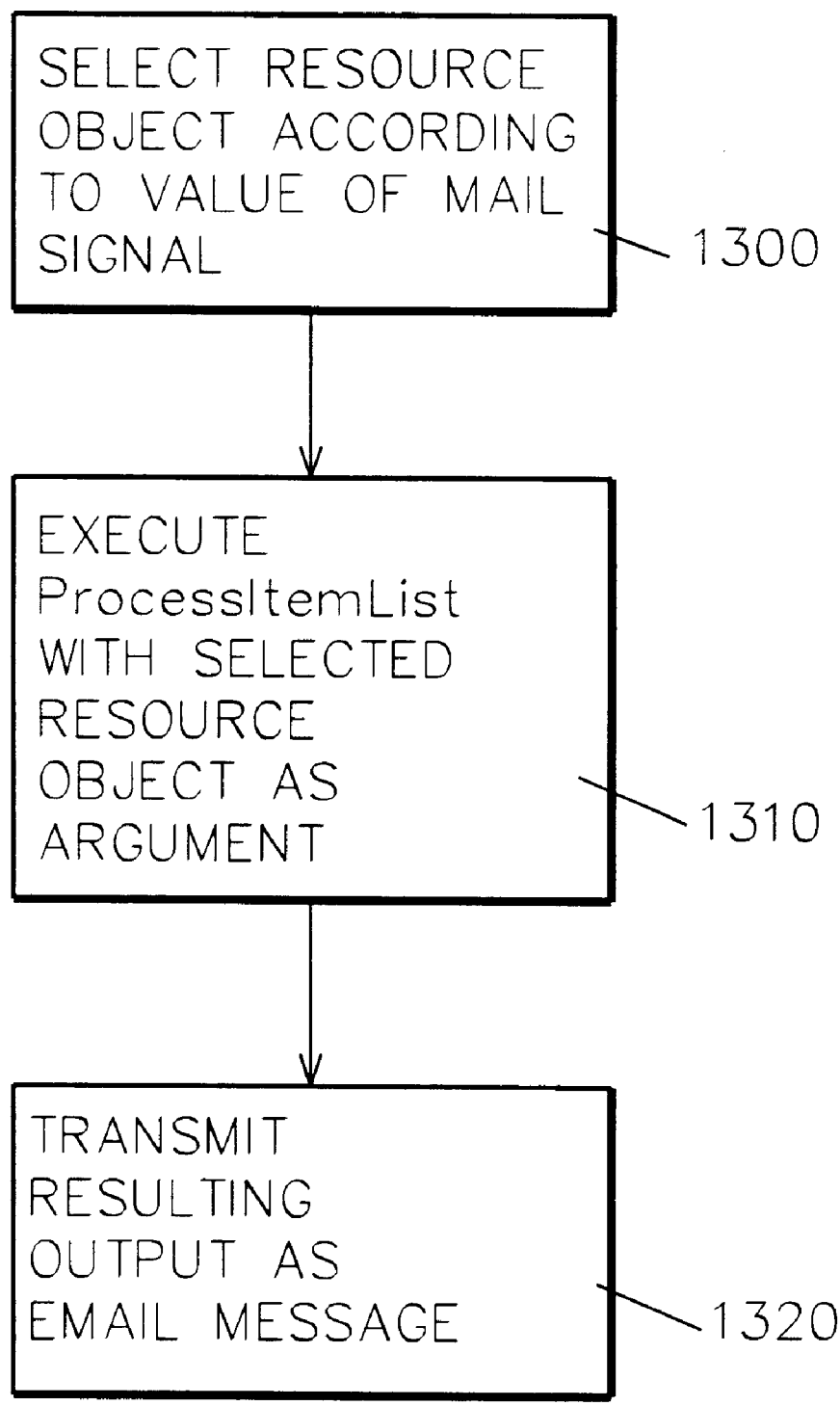
FIG. 18 is a flow chart showing the steps taken by the data server of the invention when processing a mail signal.

Referring to FIG. 18, when the data server receives a mail signal, it selects a Resource Object of type TEXT associated with that signal (step 1300). Next, the routine ProcessItemList is executed with the Item List of the selected Resource Object as an argument (step 1310). The resulting output is then transmitted over the intranet as the body of an email message, using the SMTP protocol, to a destination associated with the mail signal which prompted the message to be sent (step 1320). The destination may be preprogrammed into the system, or it may be specified by the signal, in the case, for example, of an incoming email message.

What is claimed is:

1. A method for serving data from a networked device having a memory, a microprocessor, and a network interface, comprising the steps of:

(a) storing in the memory an executable program image comprising a server program, a plurality of resource objects and a plurality of page items, each resource object having associated with it at least one page item;

(b) receiving a data resource request signal at the microprocessor;

(c) executing instructions in the server program to select a first resource object from the plurality of resource objects in the executable program image according to the data resource request signal;

(d) for a plurality of the page items in the executable program image that are associated with the first resource object, executing instructions in the server program to generate successive data fragments according to instructions specified by the successive page items, at least some of the successive data fragments containing only portions of instructions in a markup language;

(e) concatenating at least the successive data fragments to form a stream of data containing complete instructions in a markup language; and (f) transmitting the stream of formatted data from the microprocessor to a second device via the network.

2. The method of claim 1, wherein the data resource request signal is a message received from the second device via the network.

3. The method of claim 2, further comprising:

(g) receiving a data resource request signal comprising web page form data;

(h) selecting a second resource object in the executable program image;

(i) identifying a name=value pair in the web page form data;

(j) selecting one of a set of page items associated with the second selected resource object and with the name of the name=value pair; and (k) processing the value of the name=value pair according to instructions specified by the selected page item.

4. The method of claim 3, wherein at least one of the plurality of successive page items in step (d) is the same as the selected page item in step (j).

5. The method of claim 4, further comprising, during step (d), determining a value associated with the name of the name=value pair identified in step (i), according to instructions specified by the page item selected in step (j).

6. The method of claim 3, wherein steps (c)–(f) are performed after steps (g)–(k).

7. The method of claim 3, further comprising selecting the second resource object according to information in the data resource request signal and selecting the first resource object according to information in the second resource object.

8. The method of claim 2, wherein the message received from the second device is an email message.

9. The method of claim 2, wherein the message received from the second device is an HTTP message.

10. The method of claim 2, further comprising receiving coded information from the second device, performing a test on the coded information and generating a data fragment according to the results of the test.

11. The method of claim 2, wherein the message received from the second device includes a Universal Resource Locator.

12. The method of claim 1, wherein the data resource request signal is a signal generated within the networked device.

13. The method of claim 1, wherein the networked device lacks data storage devices other than semi-conductor memories.

14. The method of claim 1, wherein the networked device does not have a motorized storage device.

15. The method of claim 1, further comprising substituting tokens specified by a page item with text strings according to a lookup dictionary.

16. The method of claim 1, further comprising generating data fragments according to instructions contained in a plurality of page items specified by a page item.

17. The method of claim 1, further comprising selecting the first resource object according to information in the data resource request signal.

18. The method of claim 1, wherein the memory is a non-volatile semiconductor memory.

19. The method of claim 1, wherein the stream of formatted data comprises HTML data.

20. The method of claim 1, wherein the stream of formatted data comprises an email message.

21. The method of claim 1, further comprising transmitting the stream of formatted data using the HTTP protocol.

22. The method of claim 1, further comprising, transmitting the stream of formatted data using the SMTP protocol.

23. The method of claim 1, further comprising:

selecting a second resource object in the executable program image and, for a plurality of page items associated with the selected second resource object, including at least one of the page items associated with the selected first resource object, generating a sequence of respective data fragments according to instructions specified by the respective page items.

24. A networked device comprising:

a memory;

a microprocessor; and a network interface;

wherein the memory comprises an executable program image comprising:

a server program;

a plurality of resource objects;

a plurality of page items, each resource object being associated with at least one page item; and instructions in the server program for causing the microprocessor to:

(a) receive a data resource request signal;

(b) in response to the data resource request signal, select a first one of the resource objects;

(c) for a plurality of the page items associated with the selected first resource object, generate a sequence of respective data fragments according to instructions specified by the respective page items, at least some of the respective data fragments containing only portions of instructions in a markup language;

(d) concatenate at least the sequence of respective data fragments to form a stream of formatted data containing complete instructions in a markup language; and (e) transmit the stream of formatted data to a second device via the network interface.

25. The networked device of claim 24, wherein the instructions comprise instructions for causing the microprocessor to receive a data resource request signal from the second device via the network interface.

26. The system of claim 25, wherein the instructions further comprise instructions for causing the microprocessor to:

(f) receive a data resource request signal comprising web page form data;

(g) select a second one of the resource objects;
(h) identify a name=value pair in the web page form data;
(i) select one of a set of page items associated with the second selected resource and with the name of the name=value pair; and
(j) process the value of the name=value pair according to instructions specified by the selected page item.

27. The networked device of claim 26, wherein at least one of the page items specifies instructions for generating a data fragment and instructions for processing the value of a name=value pair contained in the web page form data.

28. The networked device of claim 24, wherein at least one of the page items is associated with at least two distinct ones of the resource objects.

29. The networked device of claim 26, further comprising instructions for causing the microprocessor to select the second selected resource object according to information received from the data resource request signal and to select the first resource object according to information in the second selected resource object.

30. The networked device of claim 25, wherein the instructions comprise instructions for causing the microprocessor to receive an HTTP message comprising a data resource request signal.

31. The networked device of claim 25, wherein the instructions comprise instructions for causing the microprocessor to receive an email message comprising a data resource request signal.

32. The networked device of claim 26, wherein the instructions instruct the microprocessor to perform steps (b)–(e) after steps (f)–(j).

33. The networked device of claim 25, wherein the instructions include instructions for causing the microprocessor to receive a data resource request containing coded information, to perform a test on the coded information, and to generate web page data based on the results of the test.

34. The networked device of claim 25, further comprising instructions for receiving a data resource request signal comprising a Universal Resource Locator.

35. The networked device of claim 24, wherein the instructions comprise instructions for causing the microprocessor to receive a data resource request signal generated within the networked device.

36. The networked device of claim 24, further comprising a lookup dictionary, and wherein the instructions specified by at least one page item include instructions for substituting tokens with text strings according to the lookup dictionary.

37. The networked device of claim 24, wherein the instructions specified by at least one page item include instructions for generating data fragments according to instructions specified by a plurality of other page items specified by the page item.

38. The networked device of claim 24, wherein the networked device lacks data storage devices other than semi-conductor memories.

39. The networked device of claim 24, wherein the networked device lacks motorized storage device.

40. The networked device of claim 24, further comprising instructions for causing the microprocessor to select the first selected resource according to information in the data resource request signal.

41. The networked device of claim 24, wherein the stream of formatted data comprises HTML data.

42. The networked device of claim 24, wherein the stream of formatted data comprises an email message.

43. The networked device of claim 24, wherein the instructions further comprise instructions for transmitting the stream of formatted data using the HTTP protocol.

44. The networked device of claim 24, wherein the instructions further comprise instructions for transmitting the stream of formatted data using the SMTP protocol.

45. The networked device of claim 27, wherein at least one of the page items specifies instructions for generating a data fragment and instructions for processing the value of a name=value pair contained in the web page form data, and wherein the instructions specified by the page item for generating a data fragment include instructions for determining a value associated with the name of the name=value pair.

46. The networked device of claim 24, wherein the memory is a non-volatile semiconductor memory.

47. A method for serving data from a networked device having a memory, a microprocessor, and a network interface, comprising the steps of:
  (a) storing in the memory an executable program image comprising a plurality of resource objects and a plurality of page items;
  (b) receiving a data resource request signal;
  (c) selecting a first resource object from the plurality of resource objects in the executable program image;
  (d) for a plurality of the page items in the executable program image that are associated with the first resource object, generating successive data fragments according to instructions specified by the successive page items;
  (e) concatenating at least the successive data fragments to form a stream of formatted data; and
  (f) transmitting the stream of formatted data to a second device via the network;
  (g) initializing state information associated with a particular page item;
  (h) while a test specified by the particular page item produces a positive result, repeating steps comprising:
    i. generating data fragments according to instructions specified by a plurality of page items specified by the particular page item;
    ii. performing other steps specified by the particular page item.

48. The method of claim 47, wherein:
the state information is an index variable;
the state information is initialized by setting the index variable to a start value specified by the particular page item;
the test compares the index variable to a limit value specified by the particular page item; and
the other steps specified by the particular page item include incrementing the index variable by an amount specified by the page item.

49. A networked device comprising:
a memory;
a microprocessor; and
a network interface;
wherein the memory comprises an executable program image comprising:
  a plurality of resource objects;
  a plurality of page items, each page item associated with one or more resource objects; and
  instructions for causing the microprocessor to:
    (a) receive a data resource request signal;
    (b) in response to the data resource request signal select a first one of the resource objects;
    (c) for a plurality of the page items associated with the selected first resource object, generate a sequence of respective data fragments according to instructions specified by the respective page items;

(d) concatenate at least the sequence of respective data fragments to form a stream of formatted data; and (e) transmit the stream of formatted data to a second device via the network interface, wherein the instructions specified by at least one of the page items comprise instructions for:

initializing state information associated with the page item; and while a test specified by the page item produces a positive result, repeating steps comprising:

i. generating data fragments according to instructions specified by a plurality of page items specified by the page item;

ii. performing other steps specified by the page item.

50. The networked device of claim 49, wherein:

the state information is an index variable;

the state information is initialized by setting the index variable to a start value specified by the page item;

the test compares the index variable to a limit value specified by the page item; and the other steps specified by the page item include incrementing the index variable by an amount specified by the page item.

* * * * *